(12) United States Patent
Orubor

(10) Patent No.: US 9,137,972 B2
(45) Date of Patent: Sep. 22, 2015

(54) PET CARE DEVICE

(71) Applicant: Lawrence Orubor, Calgary (CA)

(72) Inventor: Lawrence Orubor, Calgary (CA)

( * ) Notice: Subject to any disclaimer, the term of this patent is extended or adjusted under 35 U.S.C. 154(b) by 33 days.

(21) Appl. No.: 14/154,262

(22) Filed: Jan. 14, 2014

(65) Prior Publication Data

US 2015/0196010 A1 Jul. 16, 2015

(51) Int. Cl.
*A01K 1/00* (2006.01)
*A01K 27/00* (2006.01)
*A01K 7/00* (2006.01)
*A01K 1/01* (2006.01)
*F21V 1/00* (2006.01)

(52) U.S. Cl.
CPC ................. *A01K 27/004* (2013.01); *A01K 1/01* (2013.01); *A01K 7/00* (2013.01); *A01K 27/008* (2013.01); *F21L 2001/00* (2013.01)

(58) Field of Classification Search
CPC . A01K 27/00; A01K 27/0003; A01K 27/003; A01K 27/004; A01K 27/007
USPC .................................. 119/712, 769, 795, 796
See application file for complete search history.

(56) References Cited

U.S. PATENT DOCUMENTS

2011/0120388 A1* 5/2011 Shahbaz ........................ 119/796
2012/0137978 A1* 6/2012 McBounds ..................... 119/72
2013/0000566 A1* 1/2013 Berton ........................... 119/796

* cited by examiner

*Primary Examiner* — Monica Williams
*Assistant Examiner* — Aaron Rodziwicz
(74) *Attorney, Agent, or Firm* — Maxey Law Offices, PLLC; Stephen Lewellyn

(57) ABSTRACT

A novel pet care device for walking a dog is provided. The device integrates many pet care items that are necessary while walking a dog into a unitary device that is simple to operate and provides a new convenience to the dog owner. In certain embodiments, the device includes an integrated retractable leash, a flashlight, fluid spraying to dispose of pet waste, a source of fresh drinking water, and a water bowl from which a dog may drink the water.

10 Claims, 44 Drawing Sheets

PET CARE DEVICE

FIELD OF THE INVENTION

The present invention relates generally to devices for the care of animals, and more particularly, relating to novel device for caring for a pet while walking the pet that includes a system for cleaning up pet waste.

BACKGROUND OF THE INVENTION

Pet owners are often burdened with difficulties when talking a dog out for a walk. These difficulties include having to clean up the dog's waste and providing a clean source of drinking water for the dog. Frequently, owners must carry a leash for restraining the dog, plastic bags or a waste scope device, and a water bottle to provide water to the dog. Additionally, there are safety concerns when walking a dog at night with the visibility of the owner and dog to operators of motor vehicles sharing the road way. Thus, owners will also carry a flashlight when walking the dog at night. Further is generally undesirable to pick up and carry the dog's waste either by a plastic bag or scope device.

There exist many pet care devices that are constructed with the aim of solving some of these problems. While the devices heretofore fulfill their respective, particular objectives and requirements, they do not provide a complete pet care solution as such there exists and need for a novel pet care device, which substantially departs from the prior art, and in doing so provides an apparatus primarily developed for the purpose of reducing an owner's burden while walking a dog.

SUMMARY OF THE INVENTION

In view of the foregoing disadvantages inherent in the known types of pet care devices now present in the prior art, the present invention provides a new pet care device construction wherein the same can be used for walking a dog.

In accordance with the present invention, an apparatus for walking a dog that combines many of the necessary care items together into a unitary device that is simple to operate and carry is provided.

In general, in one aspect, a pet care device is provided. The device includes a housing having a handle that is graspable by a user to hold the housing. A retractable leash assembly is integrated with the housing. A spray wand is pivotally attached to a bottom of the housing and is rotatable between extended and retracted positions. A pump is carried by the housing and one or more fluid nozzles positioned at an end of the spray wand and are fluidically connected to the outlet of the pump. A chemical concentrate container carried by the housing and a fresh water container carried by the housing are fluidically connected to the inlet of the pump. A proportional valve is fluidically connected to the inlet of the pump, the fresh water container, and the chemical concentrate container and operates to proportion an amount of chemical concentrate from the chemical concentrate container with an amount of fresh water from the fresh water container. A water bowl is pivotally attached to a rearward end of the housing and is rotatable between a retracted and extended position. A fresh water valve is fluidically connected to the fresh water container and is operated to fill the water bowl with fresh water from the fresh water container when the water bowl is in the extended position.

In general, in another aspect, a pet care device is provided. The pet care device includes a housing having handle that is graspable by a user to hold the housing. A retractable leash assembly is integrated with a forward end of the housing. A spray wand is pivotally attached to a bottom of the housing and is rotatable between extended and retracted positions. A first pump is carried by the housing and is fluidically connected at its outlet to a first nozzle that is disposed at an end of the spray wand. A fresh water container that carried is the housing is fluidically connected to the inlet of the first pump. A second pump is carried by the housing and is fluidically connected at its outlet to a second fluid nozzle disposed at an end of the spray wand. And a chemical concentrate container that is carried by the housing is fluidically connected to the inlet of the second pump.

In general, in yet another aspect, a pet care device is provided. The pet care device includes a housing having a handle that is graspable by a user to hold the housing. A retractable leash assembly is integrated with a forward end of the housing. A spray wand is pivotally attached to a bottom of the housing and is rotatable between extended and retracted positions. A fluid nozzle disposed at an end of the spray wand and is fluidically connected with a container of fluid located within the housing. An operator is operatively connected to the container to dispense a fluid from the container and the nozzle.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

Figure 1:
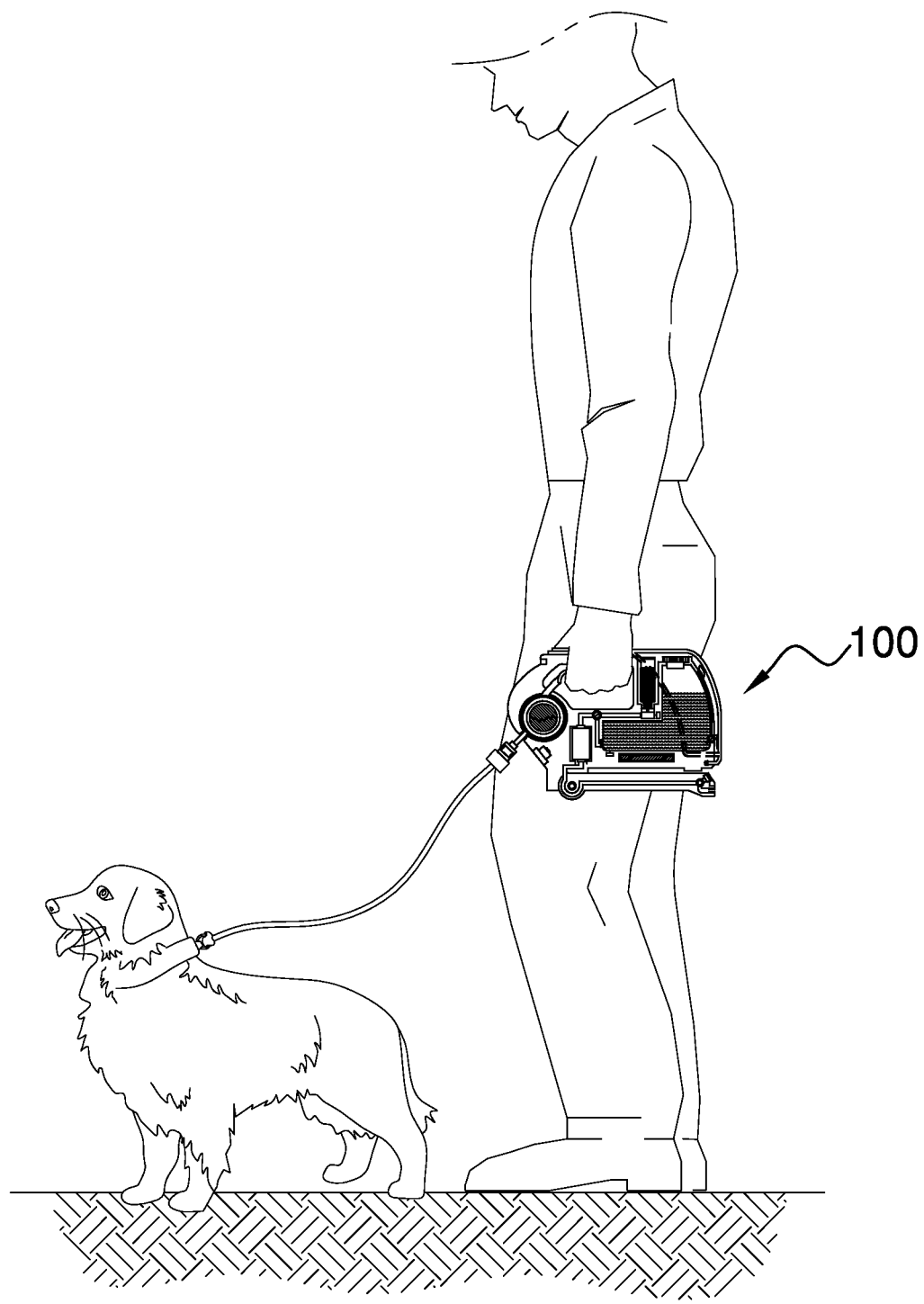
FIG. 1 is a diagrammatic view of a pet care device constructed in accordance with the principles of an embodiment of the present invention, and shown in-use with a dog connected to a leash of the device.
Figure 2:
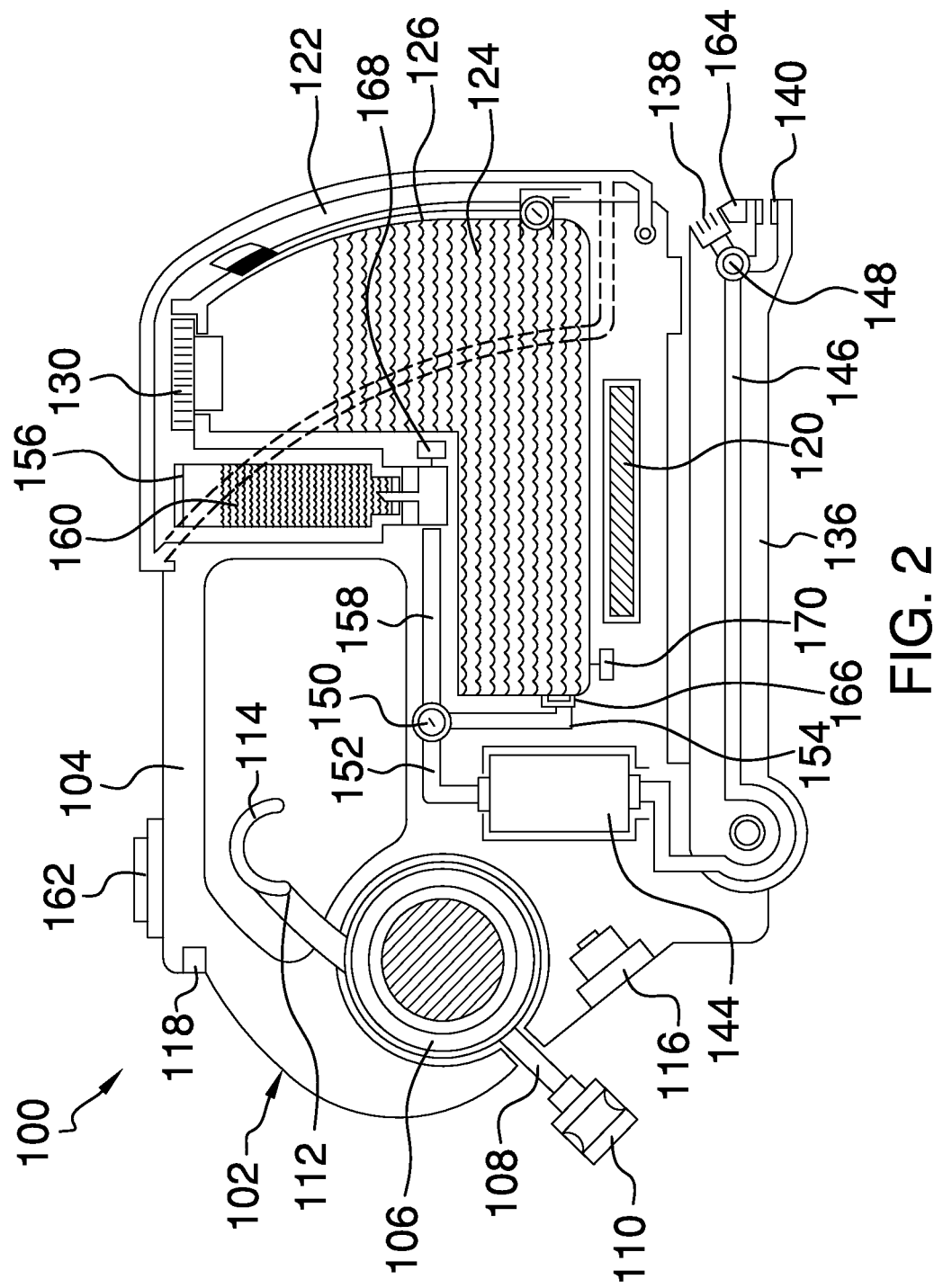
FIG. 2 is a diagrammatic view of the pet care device of FIG. 1.

Initially with reference to FIGS. 1 through 7, there is diagrammatically illustrated a new pet care device 100 in accordance with an embodiment of the present invention. As will be described in detail below, device 100 provides a pet owner with necessary pet care items when walking the pet, for example, on a roadway or in a park. Device 100 includes a casing or housing 102 that contains the various components of the device and which is configured to be grasped at handle 104 and carried by a user while walking a pet (FIG. 1).

A conventional retractable leash assembly 106 is contained within a forward portion of housing 102 and includes a retractable leash 108 that is fitted with a coupling 110 for attachment to a collar and a control lever or the like 112 for operating the extension and refraction of the leash 108. Lever 112 is disposed approximate handle 104 and includes a finger grip 114 permitting a user to operate lever 112 by a finger while grasping handle 104.

A flash light 116 is also positioned at the forward end of housing 102 and is operated by a button or switch 118 to turn the flash light on-and-off as desired by the user. A source of electrical power, such as rechargeable battery 120 provides the necessary electrical power to operate the flash light 116.

Figure 6:
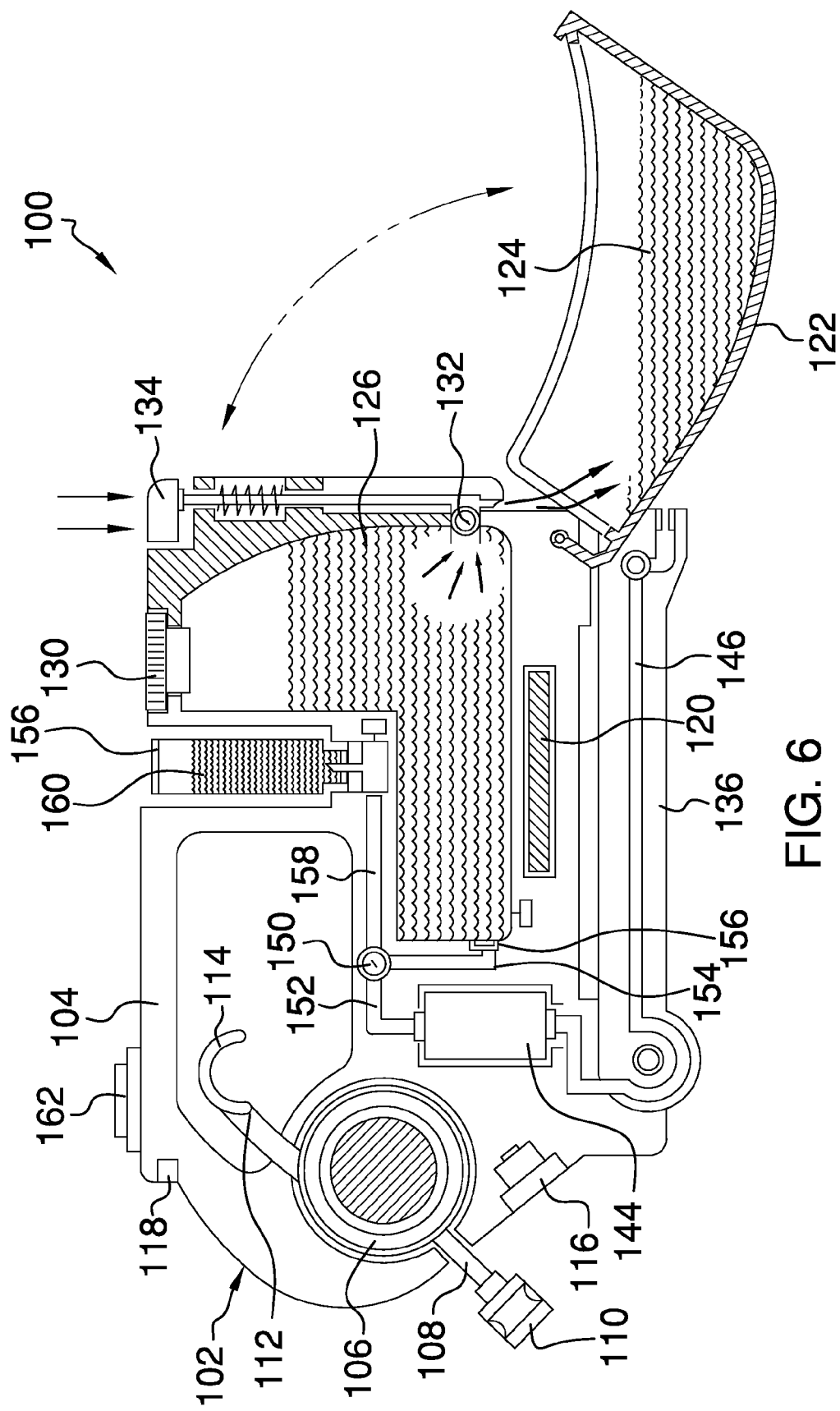
FIG. 6 is a diagrammatic view of the pet care device of FIG. 1, showing the device in another mode of operation in connection with an integrated water bowl.

A water bowl 122 is pivotally attached to a rearward end of housing 102 and is rotatable toward and away from the housing between a stored position (FIG. 2) and an extended position (FIG. 6). In the stored position the water bowl 122 is configured to partially wrap-around or enclose a portion of the rearward end of housing 102. In the extended position the water bowl 122 is positioned such that a user, while grasping handle 104, is able to present the water bowl to the pet for drinking.

Figure 3:
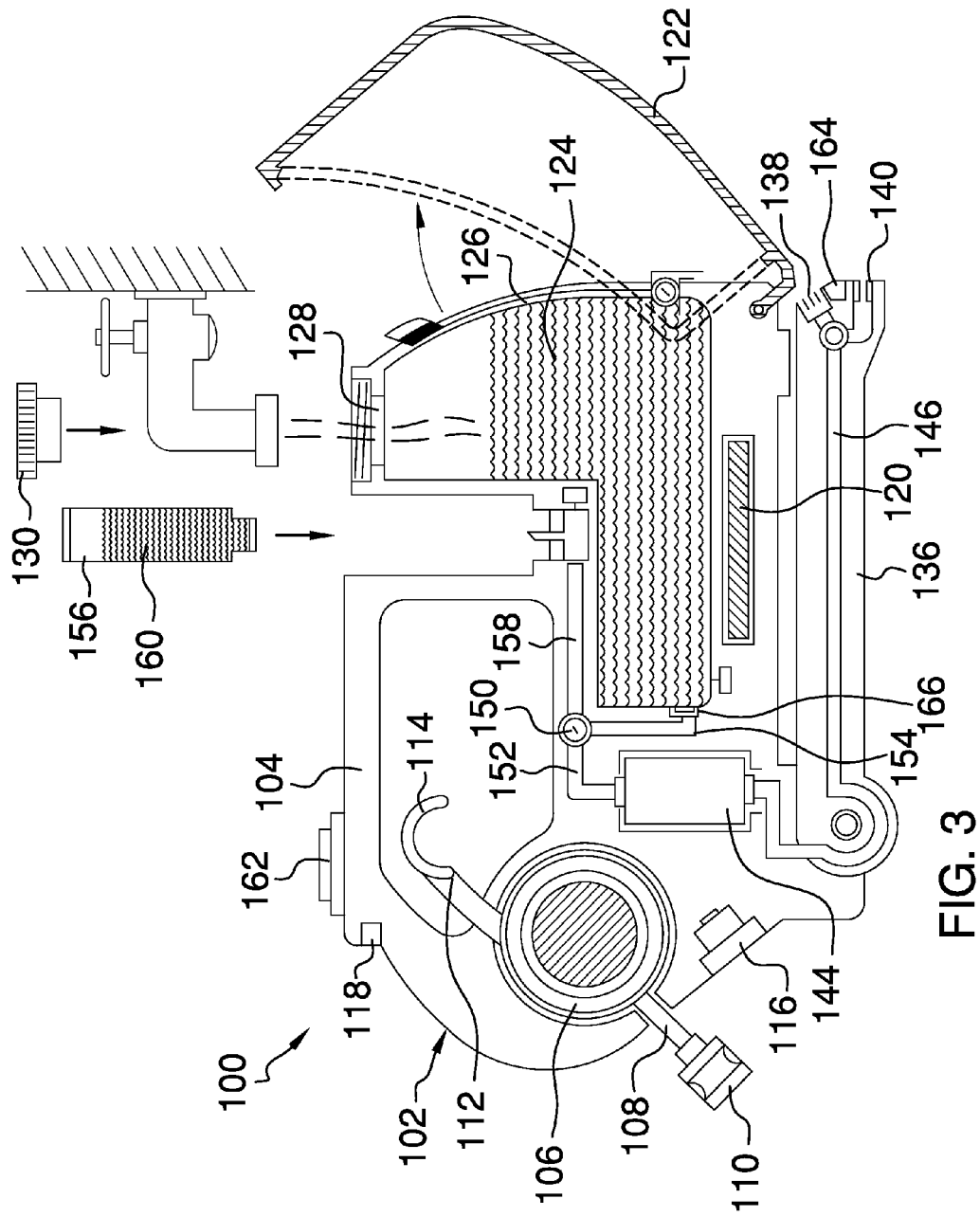
FIG. 3 is a diagrammatic view of the pet care device of FIG. 1, showing several components in alternative positions.
Figure 7:
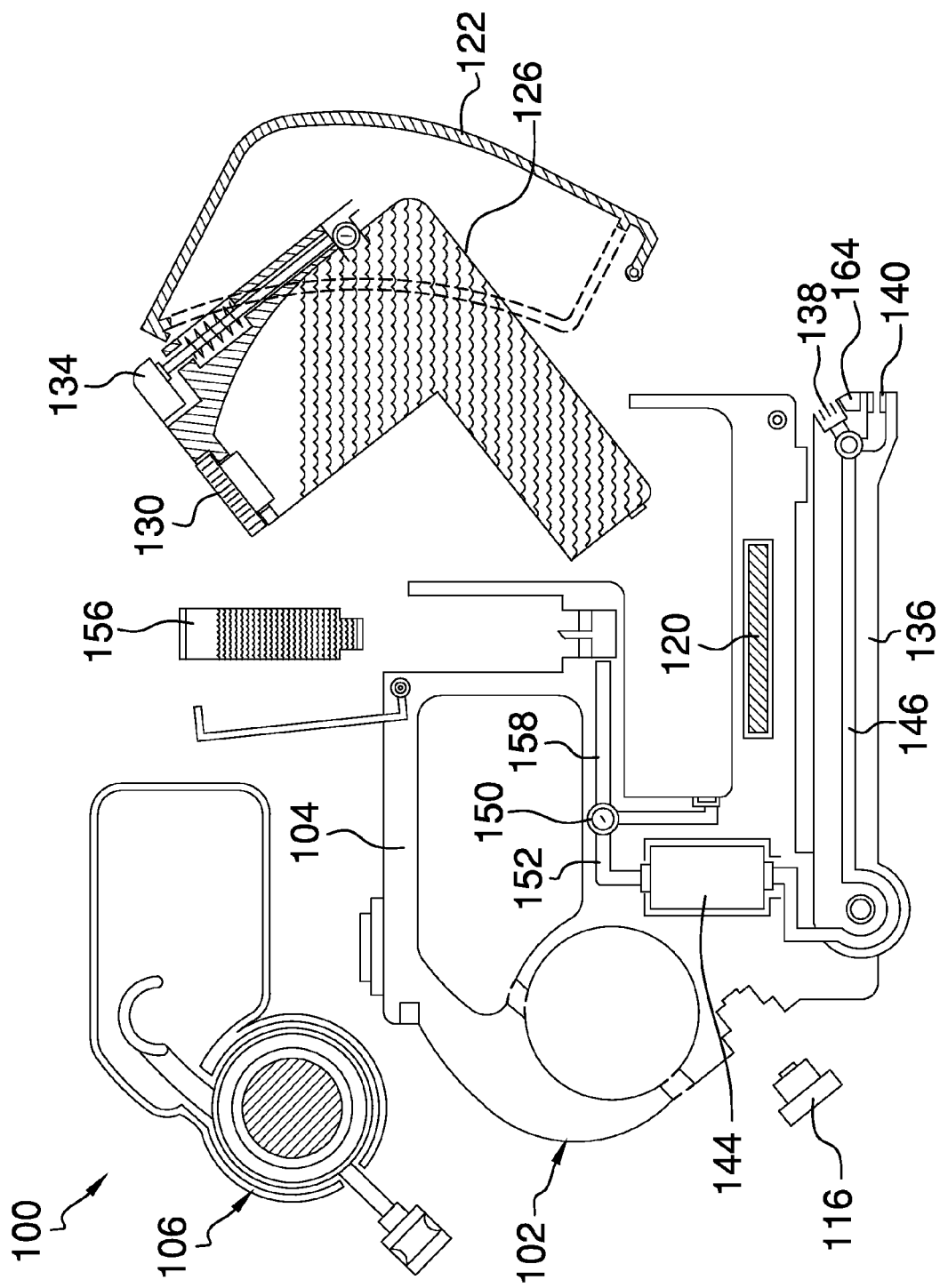
FIG. 7 is a diagrammatic exploded view of the pet care device of FIG. 1.

A quantity of fresh water 124 is contained or held within fresh water container 126 that may be integral with housing 102 (FIGS. 1-6) or removably received by housing 102 (FIG. 7). Container 126 includes a fill opening or neck 128 for filling the container with fresh water (FIG. 3). A lid 130 is removably attachable to container 126 to seal the fill opening 128.

As best seen in FIG. 6, a valve 132 is fluidically connected to container 126 and is operated to dispense fresh water 124 into the extended water bowl 122. An operator 134 is operatively connected to valve 132 to open and close the valve to fill the water bowl.

Referring again to FIGS. 1-7, device 100 further includes a spray wand 136 pivotally attached to a bottom end of housing 102 and rotatable in a direction toward and away from the housing between a retracted position (FIG. 2) and an extended position (FIGS. 4 and 5). A pair of nozzles 138, 140 are disposed at the end of the spray wand 136 and are configured to selectively spray fluid from the spray wand at a target 142, such as, for example, animal excrement left by the user's pet. Nozzle 138 is low pressure nozzle configured to saturate the target with a fluid and nozzle 140 is a high pressure nozzle configured to wash away the target. Alternatively, nozzles 138, 140 could be replaced by a single nozzle.

Nozzles 138, 140 are fluidically connected to the outlet of pump 144 (carried by housing 102) by fluid conduit 146. Valve 148 may be provided to selectively connect either nozzle 138 or nozzle 140 to fluid conduit 146 to spray fluid flowing through the conduit.

The inlet of pump 144 is fluidically connected to a selector or proportional valve 150 by conduit 152. The proportional valve 150 is fluidically connected to fresh water container 126 by conduit 154 and anti-siphon valve 166 and is fluidically connected to a chemical concentrate container 156 by conduit 158. It is to be understood that all fluid conduits 146, 152, 154, 158 may be flexible or ridged pipes or hoses or could be integrally formed and defined by housing 102. Proportional valve 150 is operated to proportion the quantity of chemical concentrate 160 is mixed with fresh water 124 when pump 144 is operated to spray fluid from the spray wand 136. The proportional valve 150 can be configured to have predestinated positions that correspond to various mixing ratios. And the proportional valve 150 is further configured to allow only pumping of fresh water 124.

The chemical concentrate container 156 is removably received by housing 102 and can include a seal that is punctured when received by the housing to fluidically connect the chemical concentrate container to conduit 158 to receive the chemical concentrate 160 for pumping and dispensing.

Pump 144 is electrically powered by battery 120 and pump switch or button 162 is operated by the user to turn the pump off and on. A safety switch may be included to prevent operation of the pump 144 unless the spray wand 136 is fully extended. Battery 120 may be recharged by connecting a power cable (not shown) to device 100 by known methods.

Device 100 may also include a ultra-violet lamp 164 disposed at the end of the spray wand 136. The U.V. lamp 164 is powered by battery 120 and will only operate when the spray wand 136 is fully extended as detected by a sensor or switch (not shown). An additional manual switch may also be provided to permit the user to turn the U.V. lamp 164 off or on when the spray wand 136 is extended.

In more advanced embodiments, device 100 may include a fluid sensor 168 that detects when chemical concentrate is available and a fluid sensor 170 that detects when fresh water is available. In certain embodiments, a PLC or the like is connected to fluid sensors 168 and 170 and will prevent the operation of the spray function when sensor 168 does not detect chemical concentrate or when sensor 170 does not detect fresh water. In such as instance, pump 144 is prevented from being operated. Device 100 may also include an LCD display or other suitable indicator display to provide a visual indication to the user of the status of the device, for example battery power, whether there is supply of fresh water 124 or chemical concentrate 160 available, and when certain functions of the device are available for operation.

Additionally, valves 132, 148, 150 may be electrically operated valves as opposed to manually operated valves. The valves and pump could be operated according to preprogrammed modes of operation. For example, the device 100 could be programmed to operate in a disinfection mode where the device would operate valves 148 and 150 and pump 144 according to a desired timed sequence to disinfect and flush waste from a surface.

Figure 4:
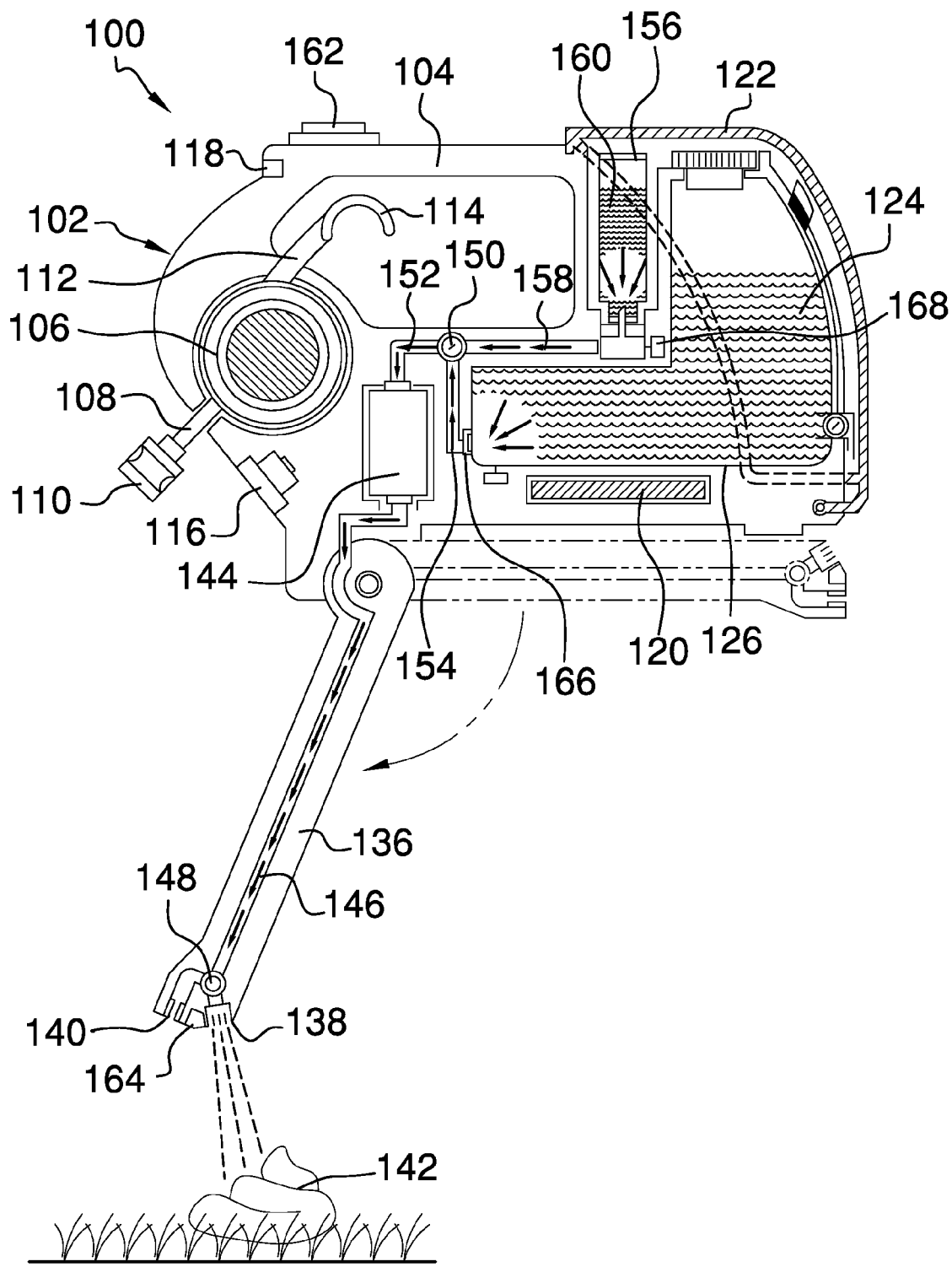
FIG. 4 is a diagrammatic view of the pet care device of FIG. 1, showing the device in a first mode of operation for treating animal waste.

With reference to FIG. 4, device 100 is shown in a first mode of operation where a mixture of chemical concentrate 160 and fresh water 124 is being sprayed onto target 142 through nozzle 138 to soak the target with the mixture to deodorize and kill bacteria and related pathogens. In embodiments, device 100 may be manually configured to operate in this first mode by manual control of valves 148 and 150. In other embodiments, device 100 is programmed to electrical control valve 148 and 150 to configure the device for this mode of operation and according to a particular time sequence.

Figure 5:
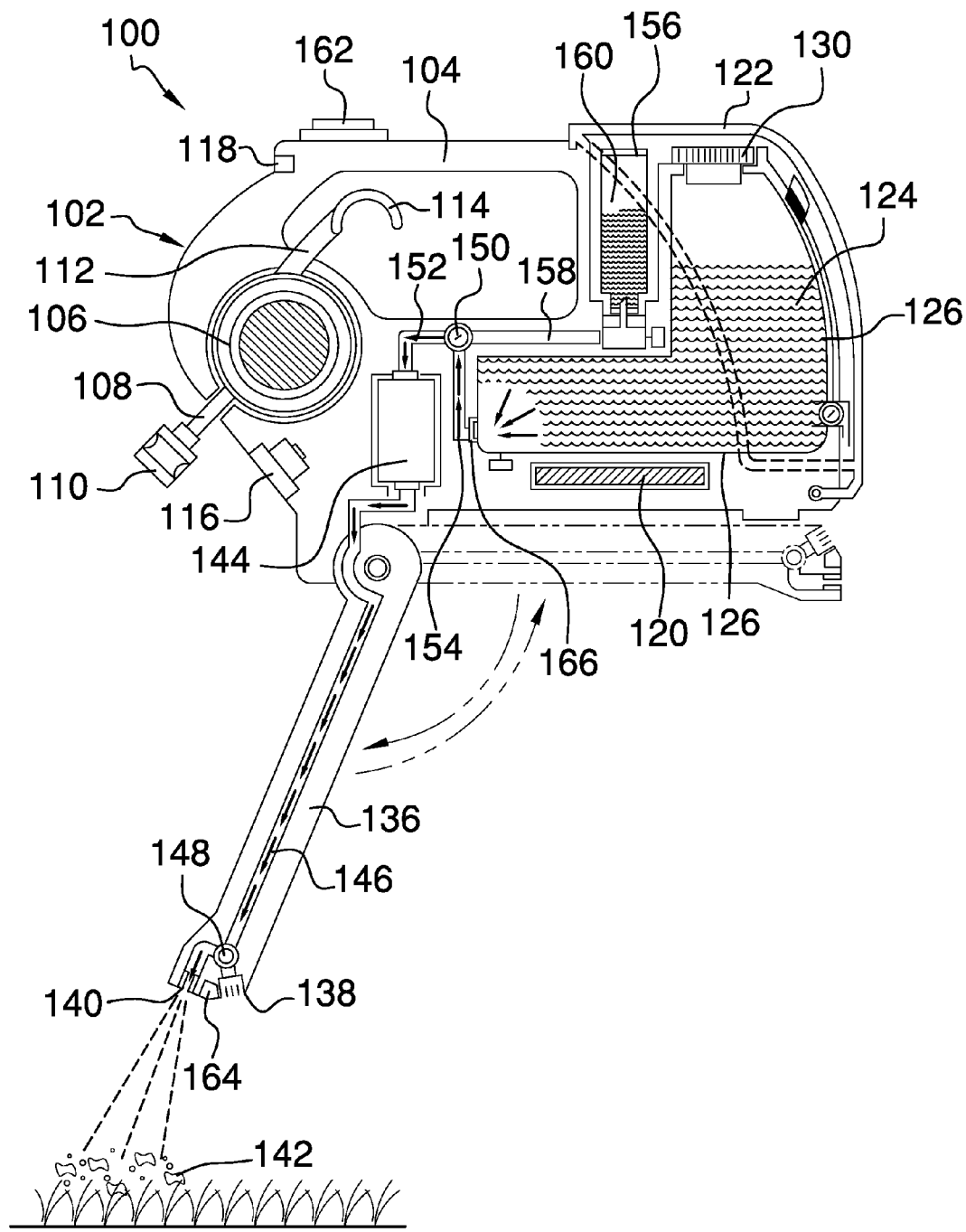
FIG. 5 is a diagrammatic view of the pet care device of FIG. 1, showing the device in a second mode of operation for clearing the treated animal waste from a surface.

With reference to FIG. 5, device 100 is shown in a second mode of operation where fresh water 124 is being sprayed onto the target 142 through nozzle 140 to forcible wash the target from the surface. Again, in embodiments, device 100 may be manually configured to operate in this first mode by manual control of valves 148 and 150. In other embodiments, device 100 is programmed to electrical control valve 148 and 150 to configure the device for this mode of operation and according to a particular time sequence.

Figure 8:
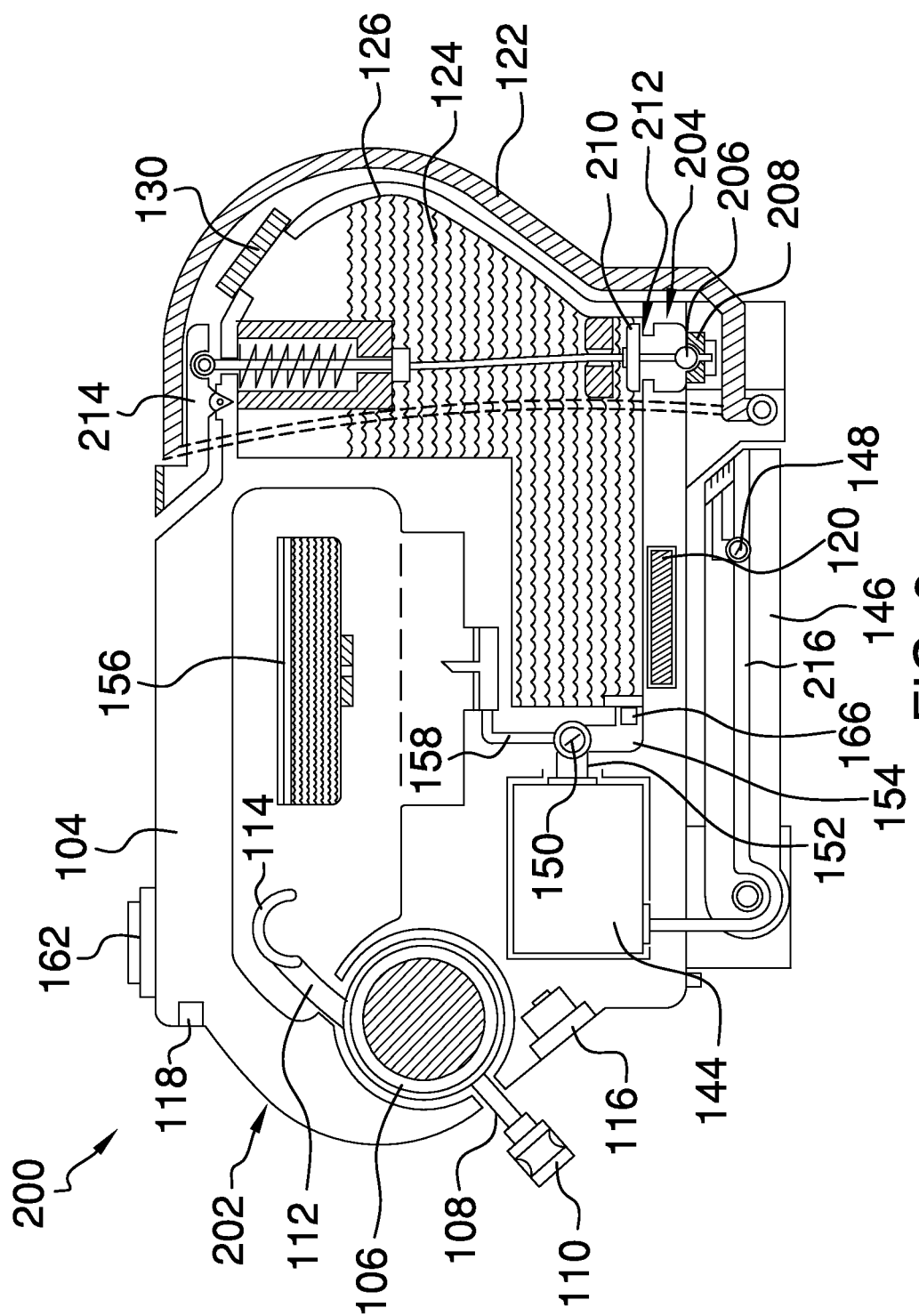
FIG. 8 is a diagrammatic view of a pet care device constructed in accordance with the principles of an alternative embodiment of the present invention.
Figure 9:
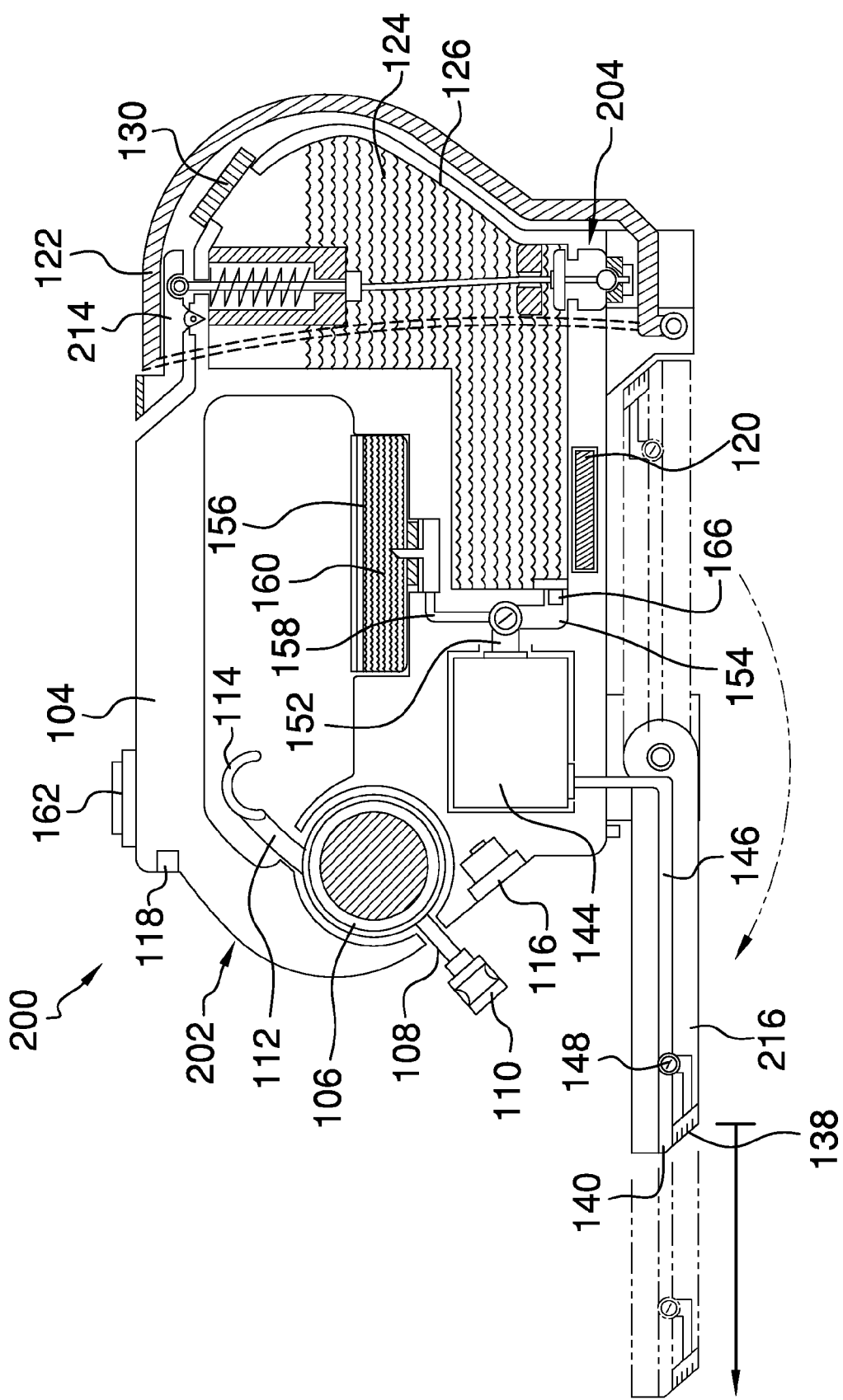
FIG. 9 is a diagrammatic view of the pet care device of FIG. 8.
Figure 10:
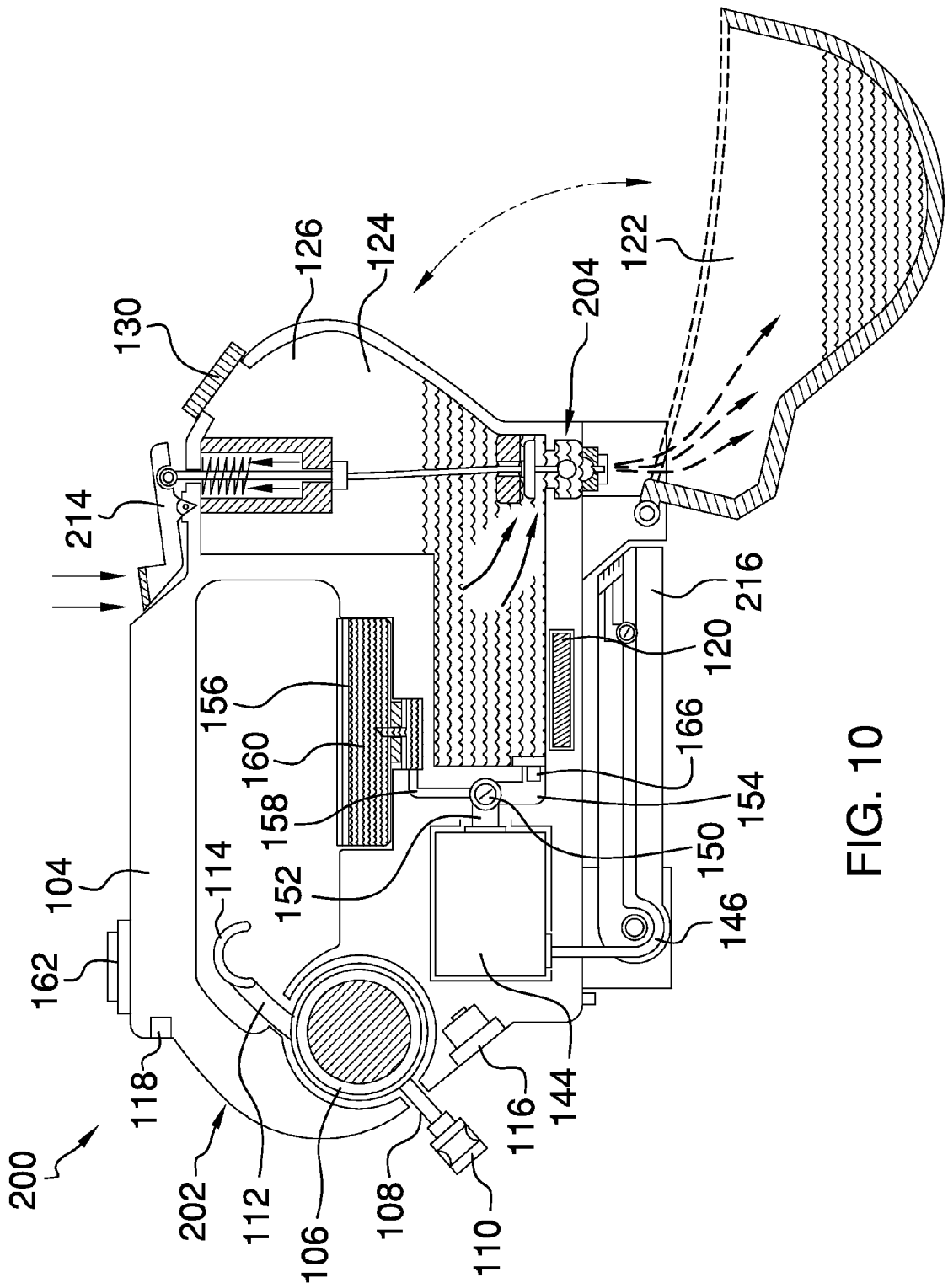
FIG. 10 is a diagrammatic view of the pet care device of FIG. 8, showing the device in-use in connection with an integrated water bowl.

With reference to FIGS. 8 through 10, there is diagrammatically illustrated a pet care device 200 in accordance with an embodiment of the present invention, wherein like reference numbers refer to similar elements previously discussed.

Device 200 includes an alternative housing 202 from housing 102 and which illustrates but one of possible alternative configurations while remaining within the scope of the invention. Additionally, device 200 includes valve 204 that replaces valve 132 of device 100. Valve 204 includes a ball 206 and related seat 208 and elastomeric seal 210 and related seat 212. An operator 214 is operatively connected to valve 204 to open and close the valve to fill the water bowl 122. Device 200 also includes an alternative spray wand 216 the replaces spray wand 136 and which is telescopic to permit adjusting its length once extended.

Figure 11:
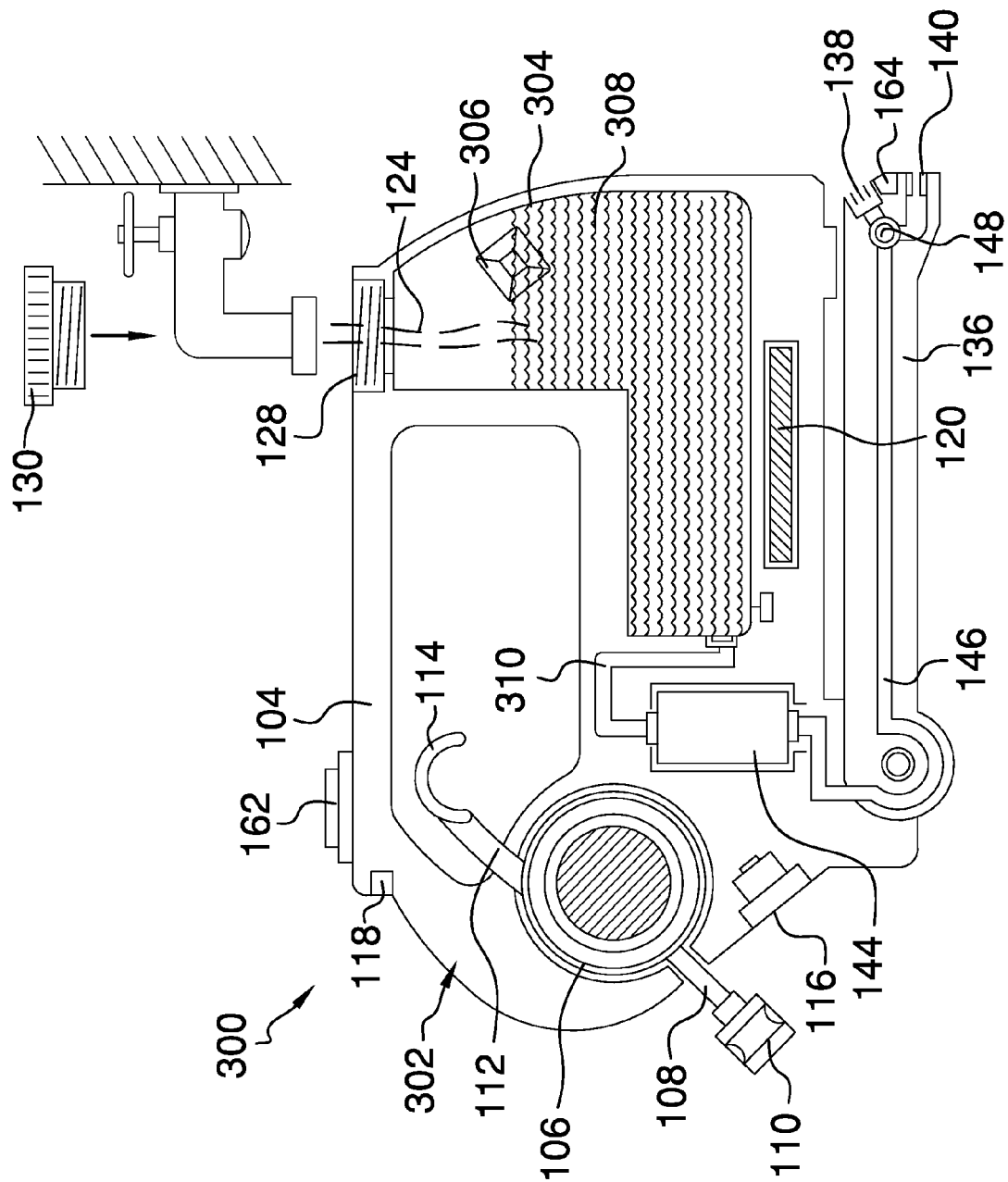
FIG. 11 is a diagrammatic view of a pet care device constructed in accordance with the principles of an alternative embodiment of the present invention.

With reference to FIG. 11, there is diagrammatically illustrated a pet care device 300 in accordance with an embodiment of the present invention, wherein like reference numbers refer to similar elements previously discussed. Device 300 is a somewhat simplified embodiment that does not include a water bowl 122 or a separate chemical concentrate container 156. Rather device 300 includes an alternative housing 302 that defines a fluid container 304 for receiving fresh water 124 and a chemical concentrate 306 (shown as a tablet but could be a liquid) for creating chemical concentrate solution 308. Additionally, valve 150 is eliminated and the inlet of pump 144 is fluidically connected to container 304 by fluid conduit 310.

Figure 12:
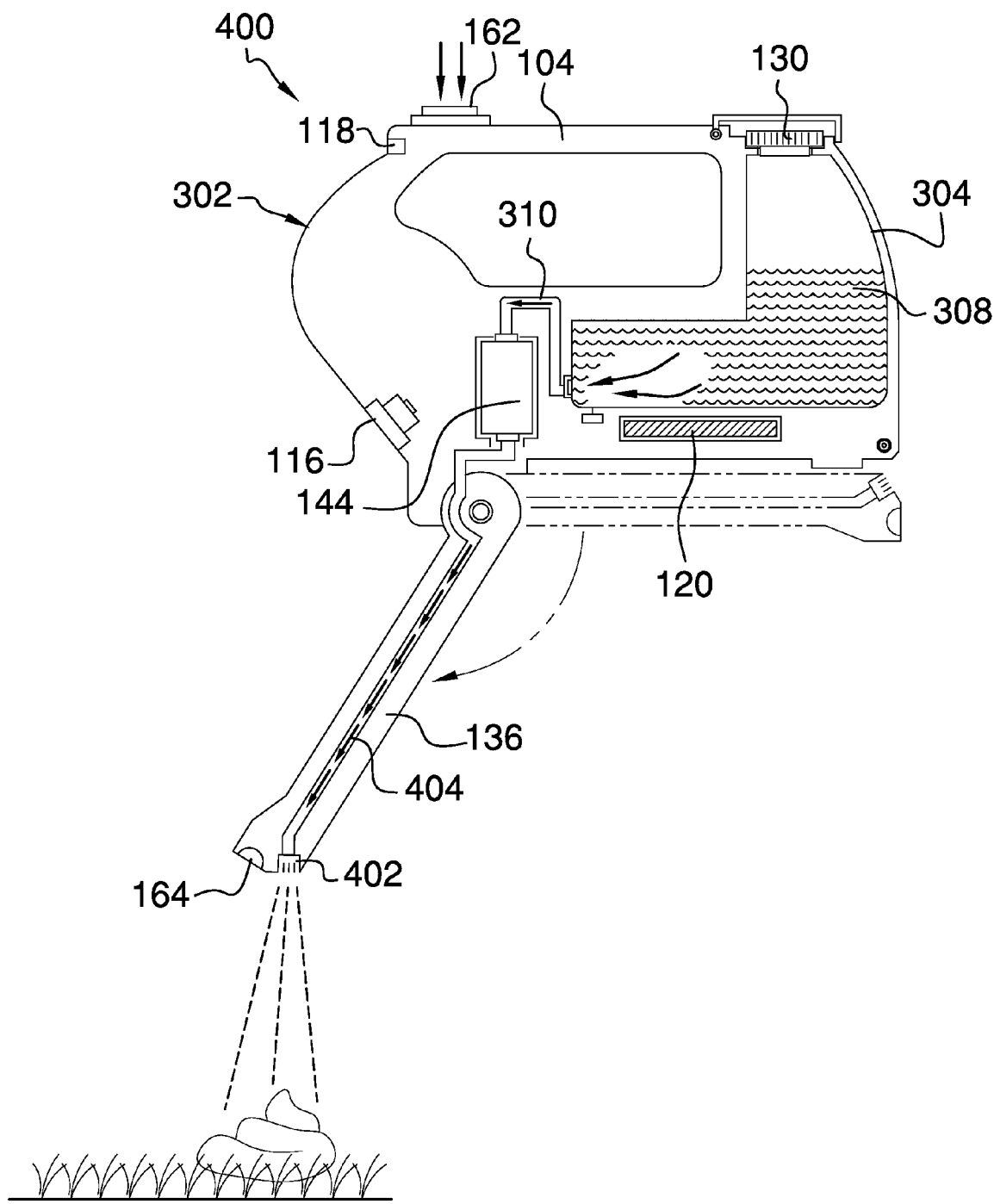
FIG. 12 is a diagrammatic view of a pet care device constructed in accordance with the principles of an alternative embodiment of the present invention.

With reference to FIG. 12, there is diagrammatically illustrated pet care device 400 in accordance with an embodiment of the present invention, wherein like reference numbers refer to similar elements previously discussed. Device 400 is most similar to device 300 in construction and demonstrates an alternative spray nozzle possibility that may be incorporated into any one of the embodiments discussed herein. Particularly, device 400 includes a single adjustable pattern spray nozzle 402 that replaces spray nozzles 138 and 140. Spray nozzle 402 is fluidically connected to the outlet of pump 144 by conduit 404.

Figure 13:
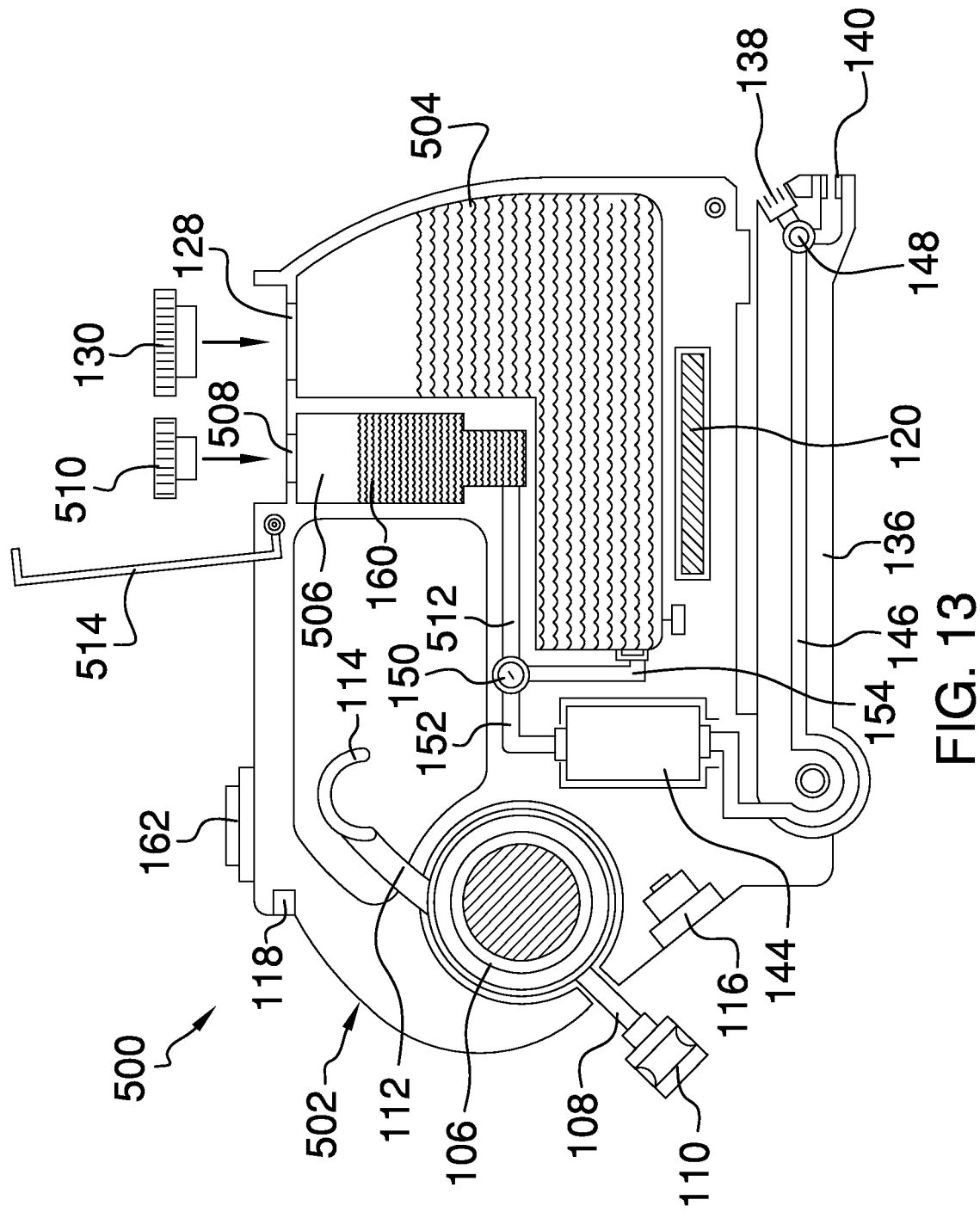
FIG. 13 is a diagrammatic view of a pet care device constructed in accordance with the principles of an alternative embodiment of the present invention.

With reference to FIG. 13, there is diagrammatically illustrated a pet care device 500 in accordance with an embodiment of the present invention, wherein like reference numbers refer to similar elements previously discussed. Device 500 is similar to device 300 in that it is a somewhat simplified embodiment of device 100 and does not include a water bowl. Device 500 includes a housing 502 that defines an integral fresh water container 504 and an integral liquid chemical concentrate container 506. Container 506 includes a fill opening or neck 508 for filling the container with a liquid chemical concentrate 160. A lid 510 is removably attachable to container 506 to seal the fill opening 508. Chemical concentrate container 506 is fluidically connected to proportional valve 150 by fluid conduit 512. Device 500 may further include a cover 514 that is hingedly connected to housing 502 and operable to cover lids 510 and 130.

Figure 14:
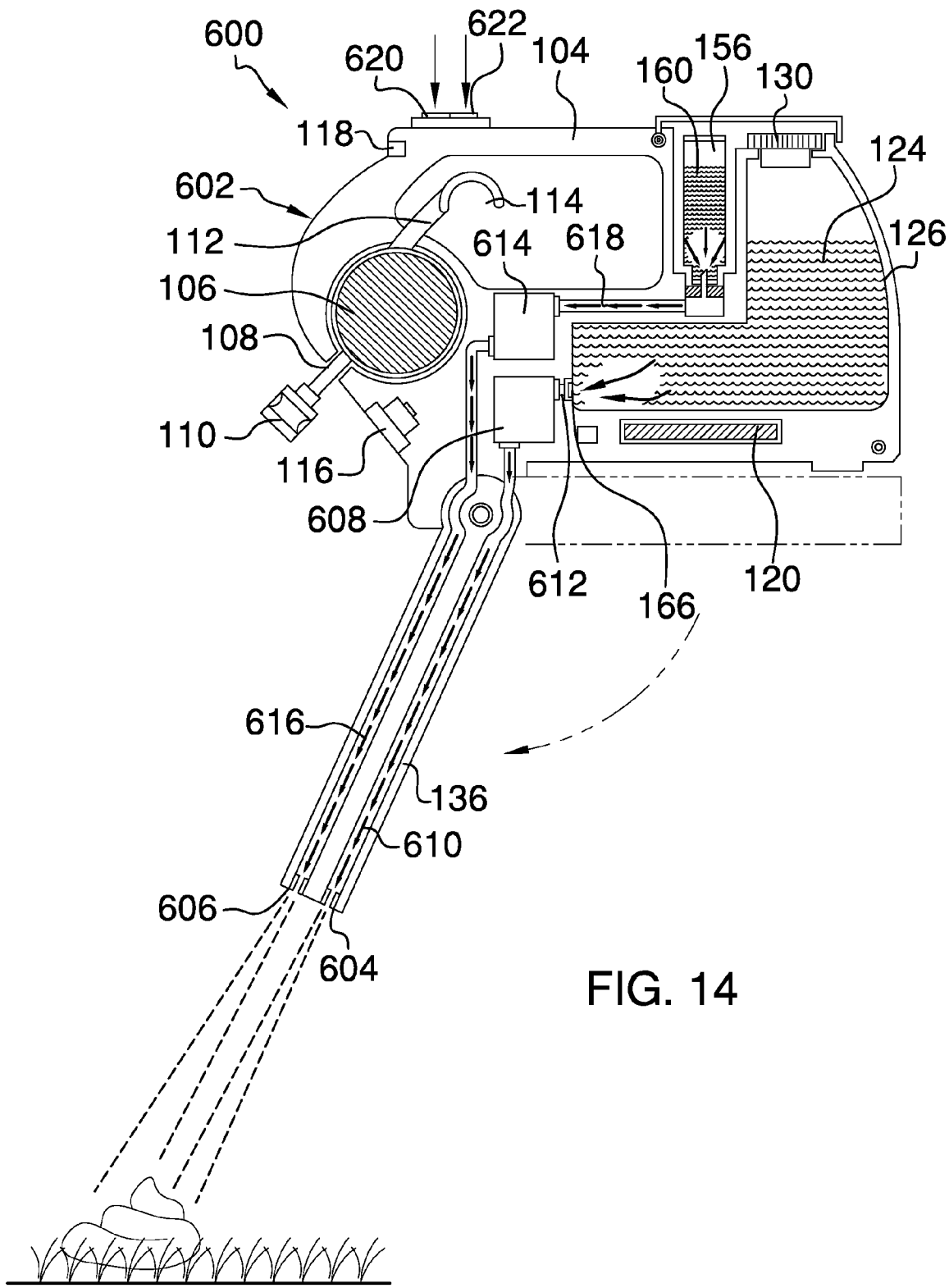
FIG. 14 is a diagrammatic view of a pet care device constructed in accordance with the principles of an alternative embodiment of the present invention.

With reference to FIG. 14, there is diagrammatically illustrated a pet care device 600 in accordance with an embodiment of the present invention, wherein like reference numbers refer to similar elements previously discussed. Device 600 includes housing 602 and a double pump configuration as opposed to the single pump configuration of the other embodiments. Particularly, device 600 includes spray nozzles 604 and 606 disposed at the end of spray wand 136. Spray nozzle 604 is fluidically connected to the outlet of a first pump 608 by conduit 610. The inlet of pump 608 is fluidically connected to fresh water container 126 by conduit 612. Spray nozzle 606 is fluidically connected to the outlet of a second pump 614 by conduit 616. The inlet of pump 614 is fluidically connected to the chemical concentrate container 156 by conduit 618.

Pumps 608 and 614 are electrically powered by battery 120 and pump switches or buttons 620 and 622, respectively, are operated by the user to turn the pumps off and on. Similarly, a safety switch may be included to prevent operation of the pumps 608 and 614 unless the spray wand 136 is fully extended. Pumps 608 and 614 may be manually operated by switches 620 and 622, respectively, or automatically operated according to a programmed control sequence. Particularly, pump 608 and 614 are concurrently operated to spray both fresh water 124 and chemical concentrate 160 on the target 142. And pump 608 is operated independently to spray only fresh water 124 on the target to flush and wash the target away 142. Of course switches 620 and 622 could be replaced by single switch that is operated to begin a preprogrammed control sequence to operate device 600 according to desired modes of operation.

Figure 15:
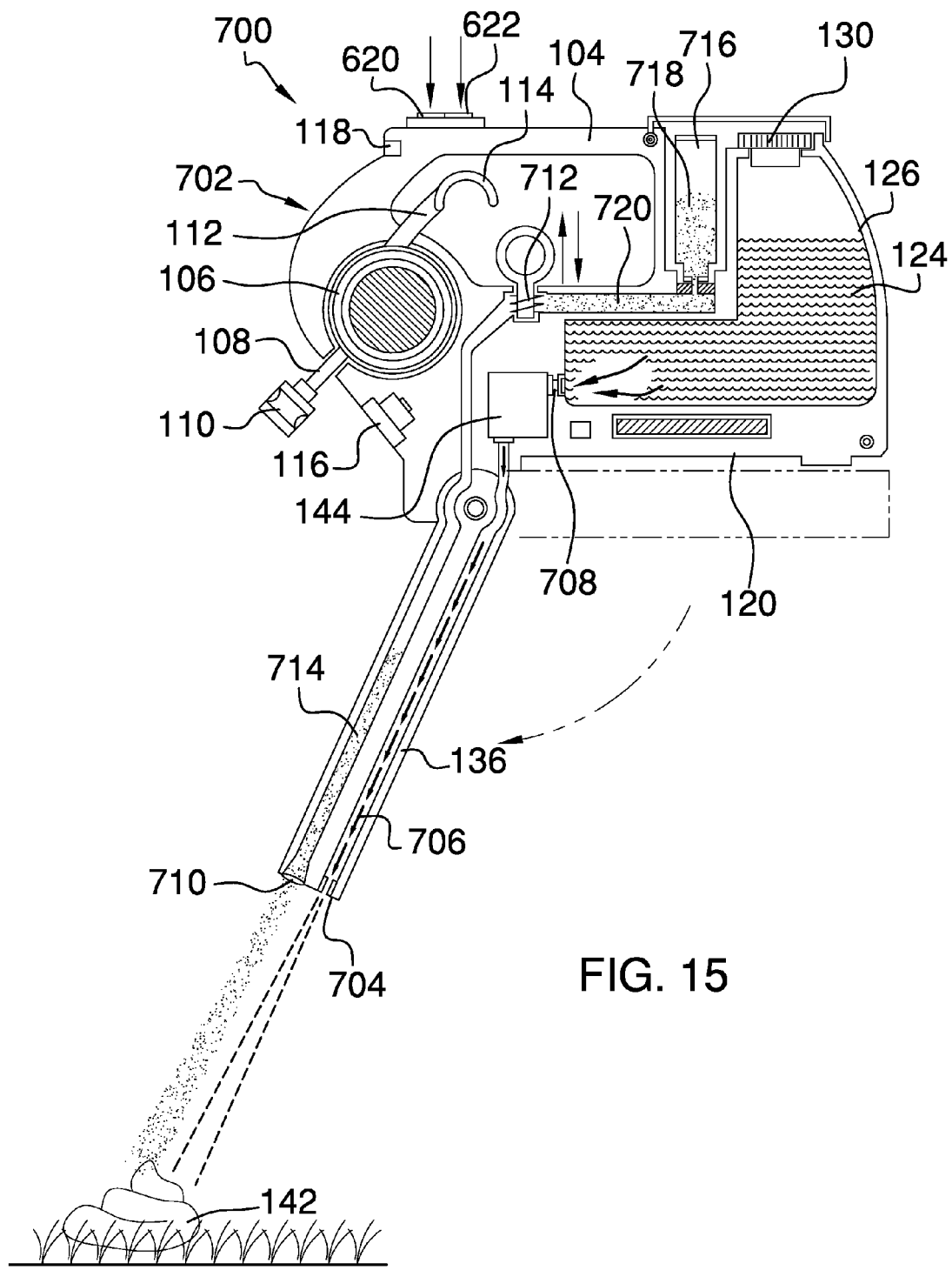
FIG. 15 is a diagrammatic view of a pet care device constructed in accordance with the principles of an alternative embodiment of the present invention.

With reference to FIG. 15, there is diagrammatically illustrated a pet care device 700 in accordance with an embodiment of the present invention, wherein like reference numbers refer to similar elements previously discussed. Device 700 includes housing 702 and a powder or granular chemical concentrate dispenser. Particularly, device 700 includes fluid spray nozzle 704 disposed at the end of spray wand 136 and that is fluidically connected to the outlet of pump 144 by conduit 706. The inlet of pump 144 is fluidically connected to fresh water container 126 by conduit 708. A solids nozzle 710 also disposed at the end of spray wand 136 and that is fluidically connected to the outlet of a conveyor 712 by conduit 714. The inlet of conveyor 712 is fluidically connected to a solids concentrate container 716 containing a supply of powered or granular chemical concentrate 718 by conduit 720.

Conveyor 712 is either manually operated or electrically operated via switch 722 to convey the powered or granular chemical concentrate 718 from its container 716 through delivery conduit 714 and out of nozzle 710 where it is dispensed upon a target 142.

Pump 144 and conveyor 712 may be manually operated by switches 162 and 722, respectively, or automatically operated according to a programmed control sequence. Particularly, pump 144 and conveyor 712 may be concurrently operated to both spray fresh water 124 and dispense chemical concentrate 718 on the target 142. And pump 144 may be operated independently to spray only fresh water 124 on the target to flush and wash the target away 142. Of course switches 162 and 722 could be replaced by single switch that is operated to begin a preprogrammed control sequence to operate device 700 according to desired modes of operation.

Figure 16:
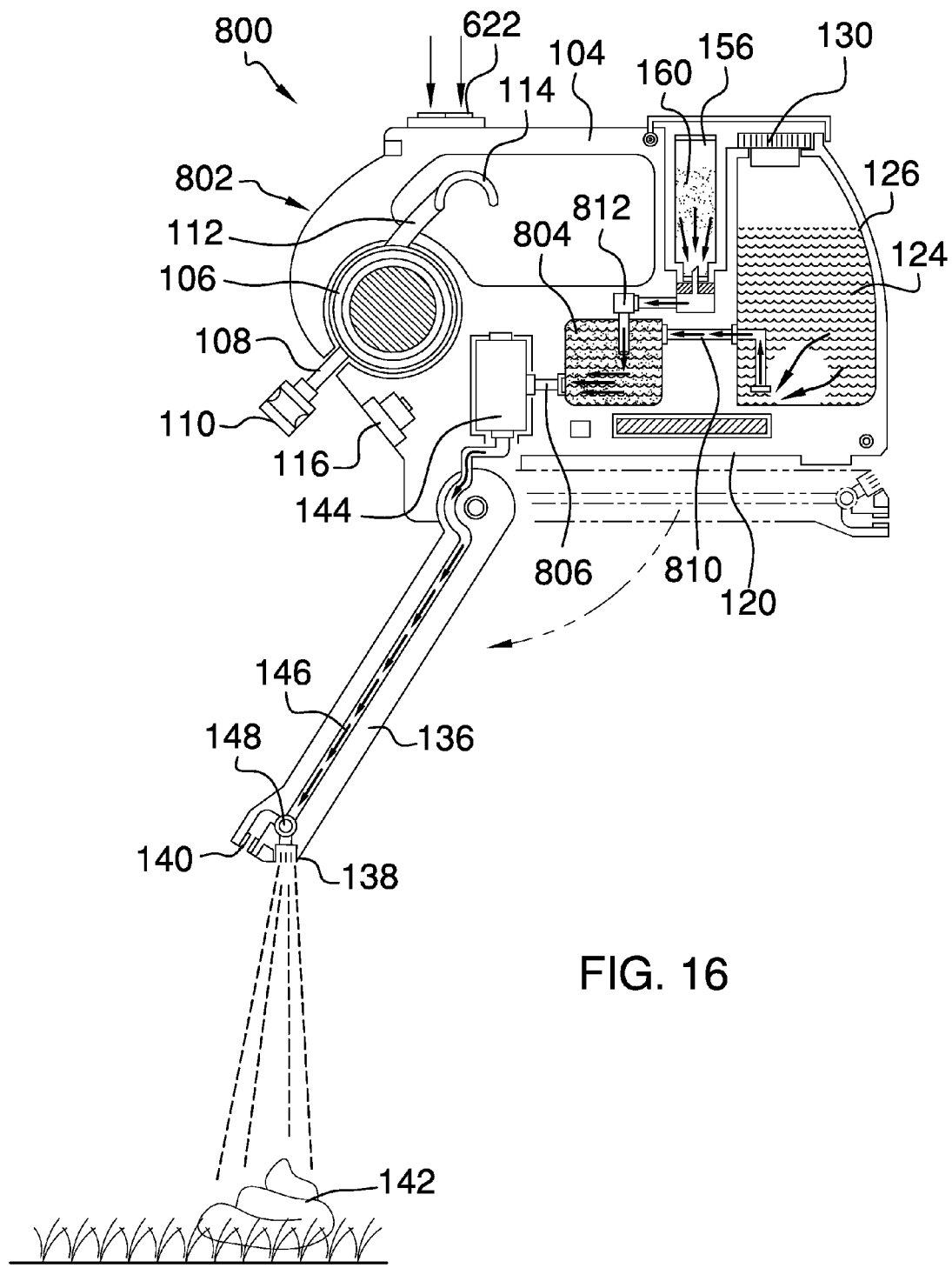
FIG. 16 is a diagrammatic view of a pet care device constructed in accordance with the principles of an alternative embodiment of the present invention.

With reference to FIG. 16, there is diagrammatically illustrated a pet care device 800 in accordance with an embodiment of the present invention, wherein like reference numbers refer to similar elements previously discussed. Device 800 includes housing 802 that defines of contains a mix container 804. The inlet of pump 144 is fluidically connected to the mixing chamber 804 by conduit 806 and the fresh water container 126 is fluidically connected to the mixing chamber by conduit 810. An injector pump 812 is fluidically connected at its outlet to the mixing chamber 804 and at its inlet to chemical concentrate container 156. In this embodiment, initial operation of pump 144 automatically causes injector pump 812 to inject a predetermined quantity of chemical concentrate 160 into the mixing chamber 804 and causes fresh water 124 to be drawn into the mixing chamber where is it mixed with the chemical concentrate and dispensed through spray nozzle 138, as illustrated.

Continued operation of pump 144 clears the mixing chamber of chemical concentrate 160 such that only fresh water 124 is disposed within the mixing chamber and sprayed, for example, through nozzle 140.

Figure 17:
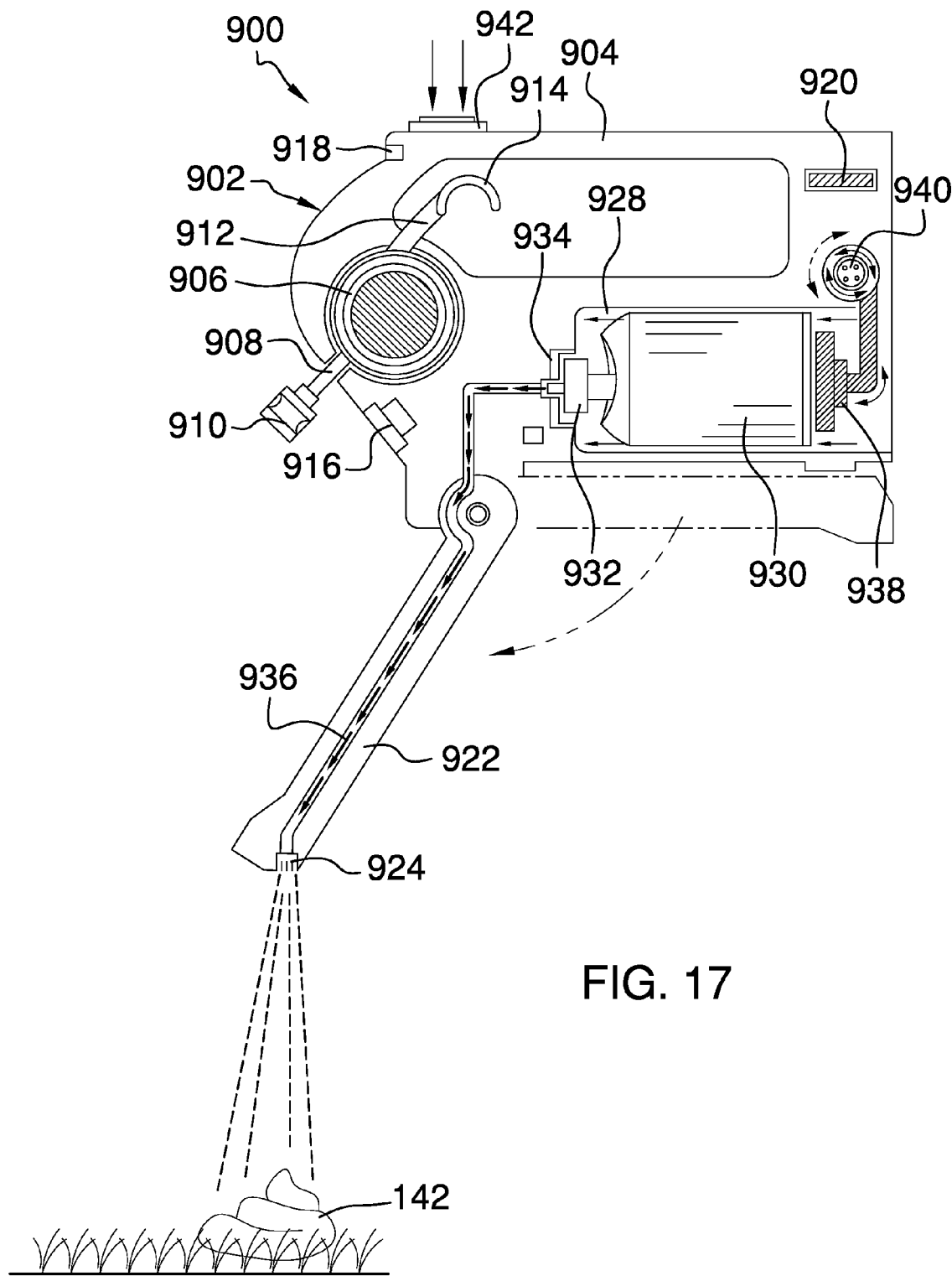
FIG. 17 is a diagrammatic view of a pet care device constructed in accordance with the principles of an alternative embodiment of the present invention.

With reference to FIG. 17, there is diagrammatically illustrated a pet care device 900a in accordance with an embodiment of the present invention. Device 900a provides a pet owner with necessary pet care items when walking the pet, for example, on a roadway or in park. In doing so, device 900 includes a casing or housing 902 that contains the various components of the device and which is configured to be grasped at handle 904 and carried by a user while walking a pet.

A conventional retractable leash assembly 906 is contained within a forward portion of housing 902 and includes a retractable leash 908 that is fitted with a coupling 910 for attachment to a collar and a control lever or the like 912 for operating the extension and refraction of the leash 908. Lever 912 is disposed approximate handle 904 and includes a finger grip 914 permitting a user to operate lever 912 by a finger while grasping handle 904.

A flash light 916 is also positioned at the forward end of housing 902 and is operated by a button or switch 918 to turn the flash light on-and-off as desired by the user. A source of electrical power, such as rechargeable battery 920 provides the necessary electrical power to operate the flash light 916.

Device 900 further includes a spray wand 922 pivotally attached to a bottom end of housing 902 and rotatable in a direction toward and away from the housing between a retracted position and an extended position (as shown). A nozzle 924 is disposed at the end of the spray wand 922 and is configured to spray a fluid from the spray wand at a target 926, such as, for example, animal excrement left by the user's pet.

Housing 902 defines a chamber or area 928 that is configured to removably receive and retain therein a container of fluid, such as a conventional aerosol container 930 having a conventional spray or dispensing valve 932. Container 930 contains a fluid under pressure, such as, for example, a deodorizer, sanitizer, or a combination of both for dispensing through nozzle 924. Container 930 is removable disposed within chamber 928 such that dispensing valve 932 is received by a complementary recess 934 defined by housing 902. Once the dispensing valve 932 is received by recess 934 the dispensing valve is placed in fluidic communication with nozzle 924 by conduit 936.

Device 900 further includes an operator mechanism 938 that is configured to engage the bottom of the container 930, opposite of valve 932, and that is operated to reciprocate the container within chamber 928 to urge the container 930 inwardly against recess 934, thereby causing the valve to operate and dispense a quantity of fluid contained within the container into conduit 936 and through nozzle 924. An electric motor 940 is operatively connected to the operator mechanism 938 and is powered by battery 920 by operation of switch 942. Motor 940 drives the operator mechanism 938 to facilitate the dispensing of fluid contained within container 930. The operation of device 900 is apparent from the above description and thus operation of the device does not require a detailed explanation herein.

Figure 18:
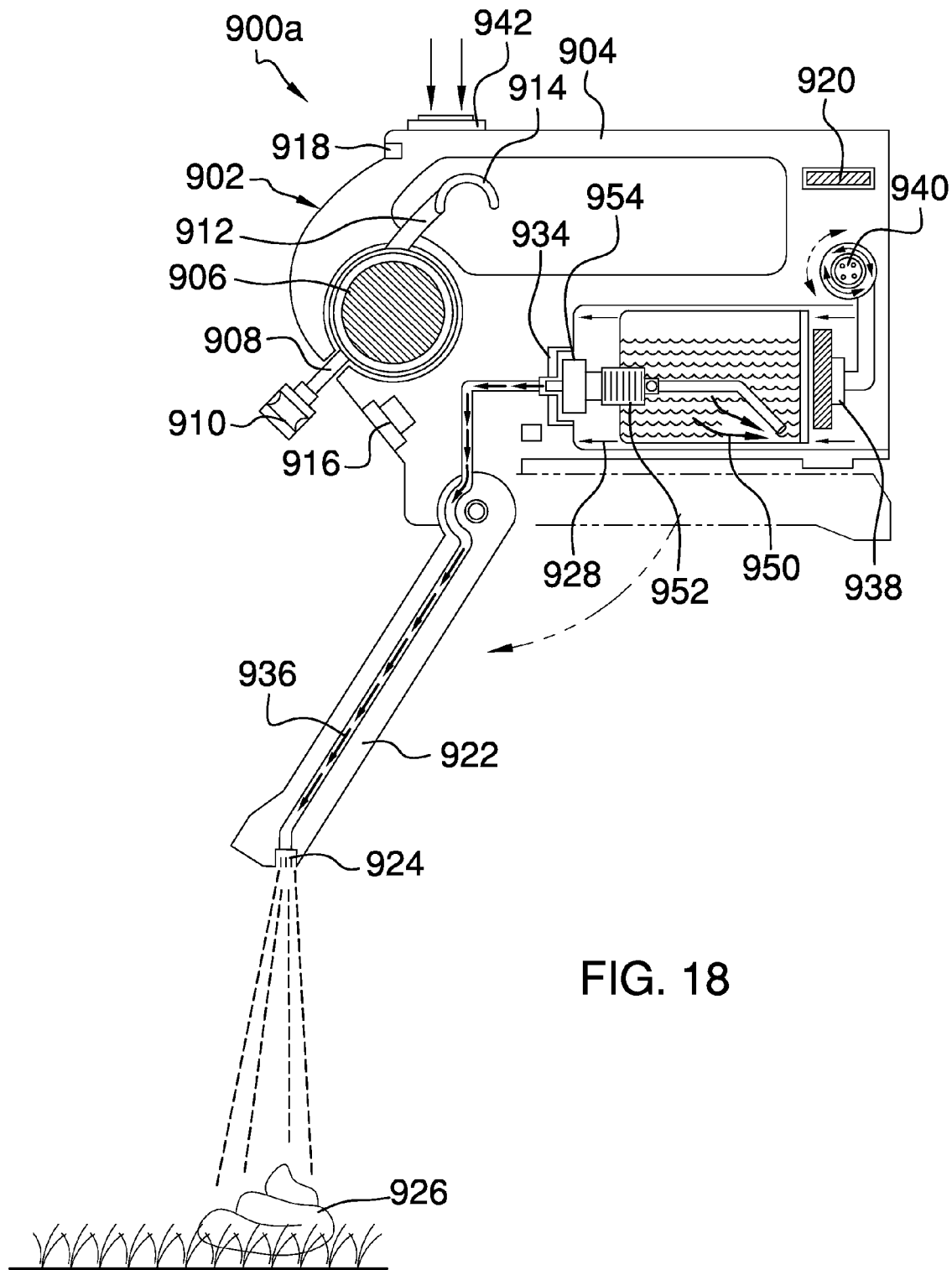
FIG. 18 is a diagrammatic view of a pet care device constructed in accordance with the principles of an alternative embodiment of the present invention.

With reference to FIG. 18, there is diagrammatically illustrated device 900 with container 930 replaced by conventional container 950 that is fitted with a conventional reciprocating manual pump 952, such as those frequently used in dispensing hand soap. Pump 952 is fitted with valve or nozzle 954 that is similar to valve 932. Container 950 contains a fluid, such as, for example, a deodorizer, sanitizer, or a combination of both for dispensing through nozzle 924. Container 950 is removable disposed within chamber 928 such that dispensing valve 954 is received by the complementary recess 934. Once the dispensing valve 954 is received by recess 934 the dispensing valve is placed in fluidic communication with nozzle 924 by conduit 936. Motor 940 is operated to drive the operator mechanism 938 to reciprocate the container 950 within the chamber 928 and thus drive pump 952 to dispense fluid from the container.

Figure 19:
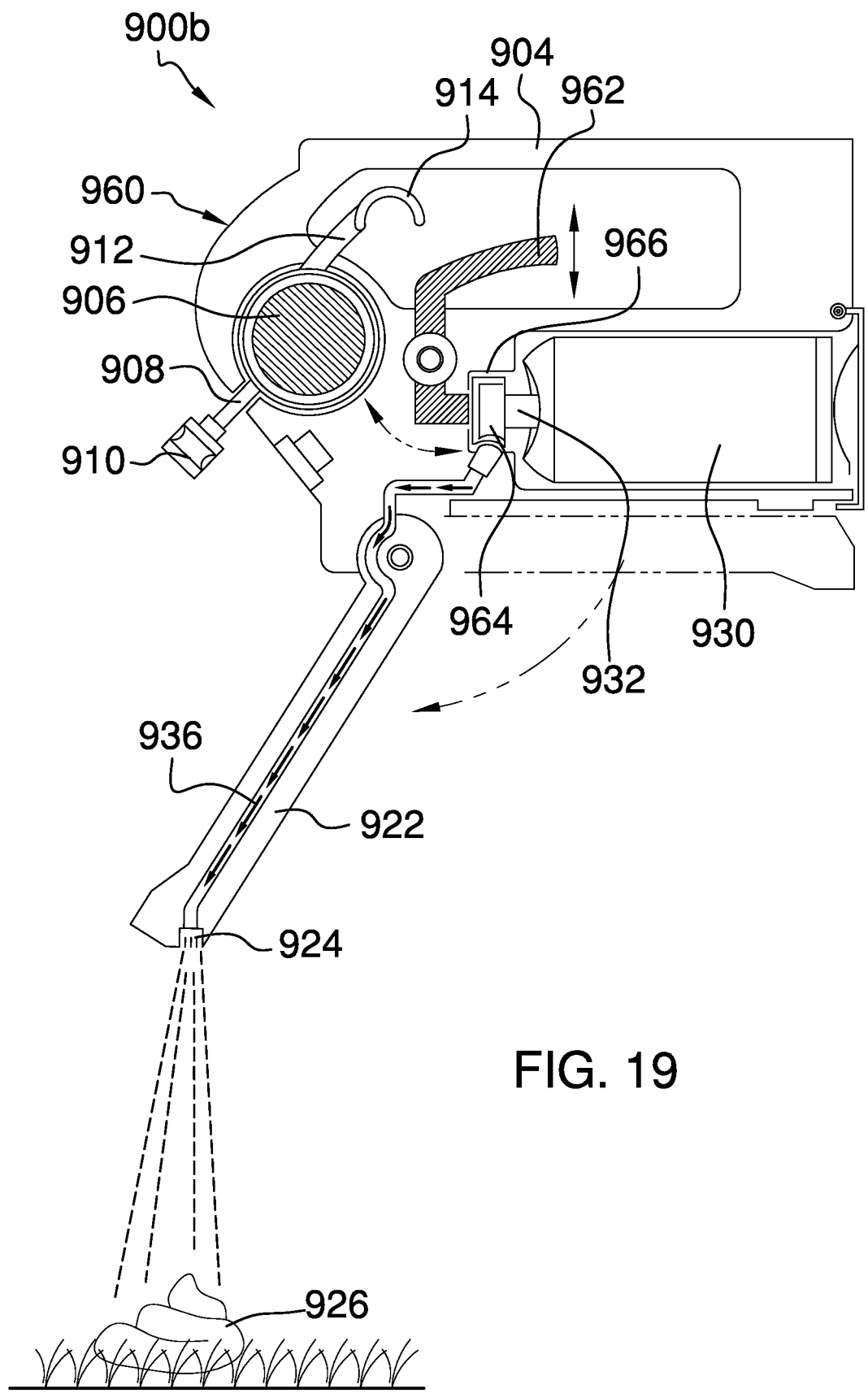
FIG. 19 is a diagrammatic view of a pet care device constructed in accordance with the principles of an alternative embodiment of the present invention.

With reference to FIG. 19, there is diagrammatically illustrated a pet care device 900b in accordance with an embodiment of the present invention, wherein like reference numbers refer to similar elements previously discussed. Device 900b includes housing 960 and is similar to device 900a illustrated in FIG. 17 with the exception of being manually operated. Particularly, device 900b includes a lever or trigger 962 that is operatively connected to a cap 964 that is disposed within recess 966 defined by housing 960. Cap 964 is free to reciprocate within recess 966 and is configured to removable receive, in a sealed fluidic relationship, the valve 932 of container 930. Cap 964 is also connected to conduit 936 and is configured to fluidically connect valve 932 to conduit 936 when the valve is received by the cap. Operating trigger 962 reciprocates the cap 964 and operates valve 932, dispensing a quantity of fluid contained within the container into conduit 936 and through nozzle 924.

Figure 20:
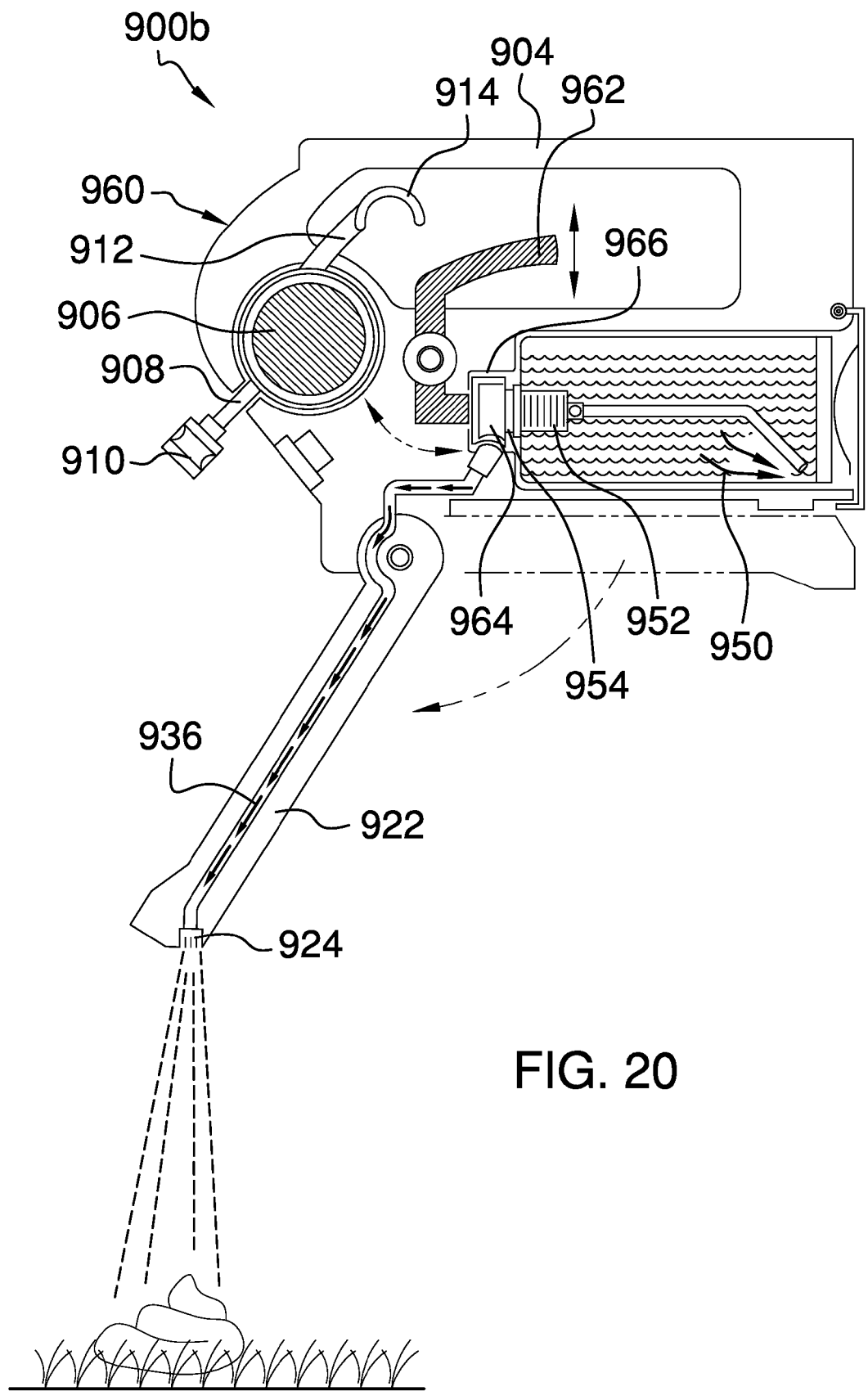
FIG. 20 is a diagrammatic view of a pet care device constructed in accordance with the principles of an alternative embodiment of the present invention.

With reference to FIG. 20, there is diagrammatically illustrated device 900b with container 950 that is fitted with a conventional reciprocating manual pump 952 similar to FIG. 18. Here nozzle 954 is removably received, in a sealed fluidic relationship with cap 964. Operating trigger 962 reciprocates the cap 964 and operates pump 952, dispensing a quantity of fluid contained within the container into conduit 936 and through nozzle 924.

Figure 21:
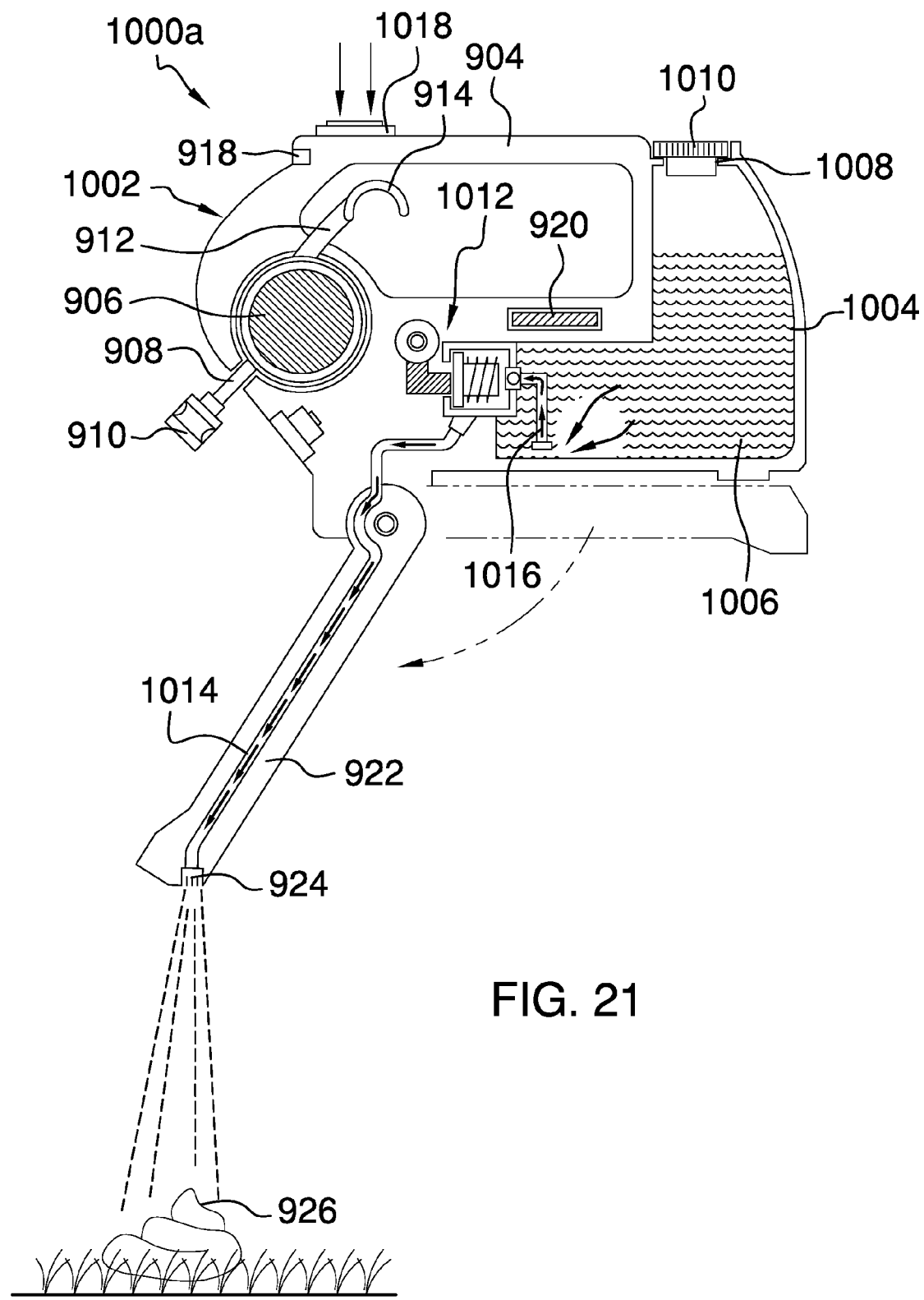
FIG. 21 is a diagrammatic view of a pet care device constructed in accordance with the principles of an alternative embodiment of the present invention.

With reference to FIG. 21, there is diagrammatically a pet care device 1000a in accordance with an embodiment of the present invention, wherein like reference numbers refer to similar elements previously discussed. Device 1000 includes housing 1002 that defines an integral fluid container 1004 holding a quantity of fluid 1006, such as, for example, water, a deodorizer, sanitizer, or a combination thereof for dispensing through nozzle 924. Container 1004 includes a fill opening or neck 1008 for filling the container with fluid 1006. A lid 1010 is removably attachable to container 1004 to seal the fill opening 1008.

Nozzle 924 is fluidically connected to the outlet of electric pump 1012 by conduit 1014 and the inlet of the pump is fluidically connected to container 1004 by conduit 1016. Pump 1012 is electrically powered by battery 920 and pump switch or button 1018 is operated by the user to turn the pump off and on. Operating pump 1012 pumps fluid 1006 from container 1004 through nozzle 924 as illustrated.

Figure 22:
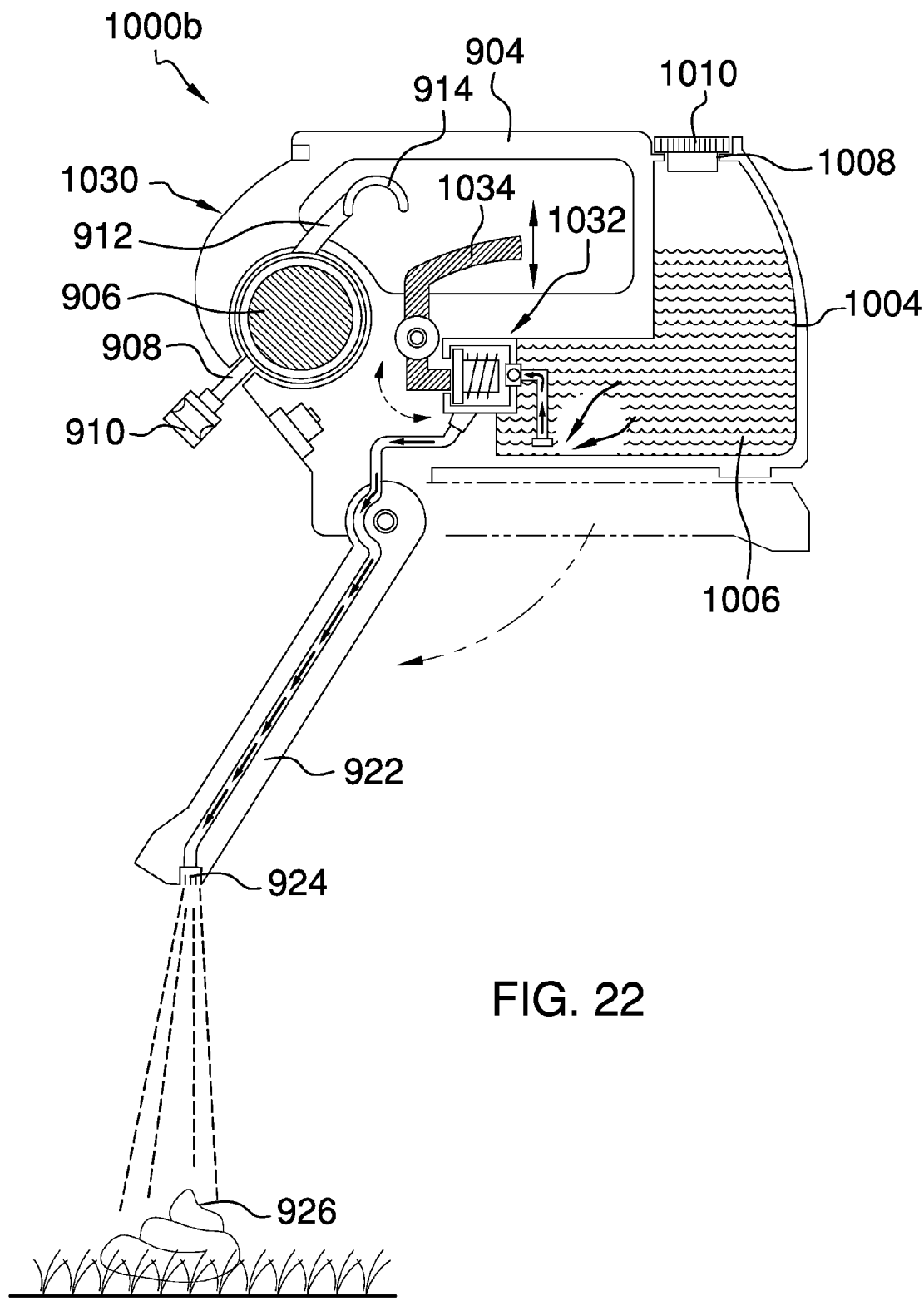
FIG. 22 is a diagrammatic view of a pet care device constructed in accordance with the principles of an alternative embodiment of the present invention.

With reference to FIG. 22, there is diagrammatically a pet care device 1000b in accordance with an embodiment of the present invention, wherein like reference numbers refer to similar elements previously discussed. Device 1000b includes housing 1030 and manual pump 1032 that replaces the electric pump 1012 of device 1000a. Pump 1032 includes a trigger or pump handle 1034 that is operated by a user's hand while grasping handle 904.

With reference to FIGS. 23 through 28, there is diagrammatically illustrated a pet care device 1100 in accordance with an embodiment of the present invention, wherein like reference numbers refer to similar elements previously discussed. Device 1100 is essentially, device 100 of FIGS. 1 through 8 with a modified housing 1102 that positions the retractable leash assembly 106 at a position between the front and rear ends of the housing, as opposed to being positioned at the front end of housing 102 as in device 100. Locating the retractable leash assembly 106 at this intermediate position may serve to balance the weight of the device 1100 while an animal is attached to the leash 108. Device 1100 also exemplifies the many different possible configurations of its housing and component placement that are possible while remaining within the scope of the invention.

Figure 23:
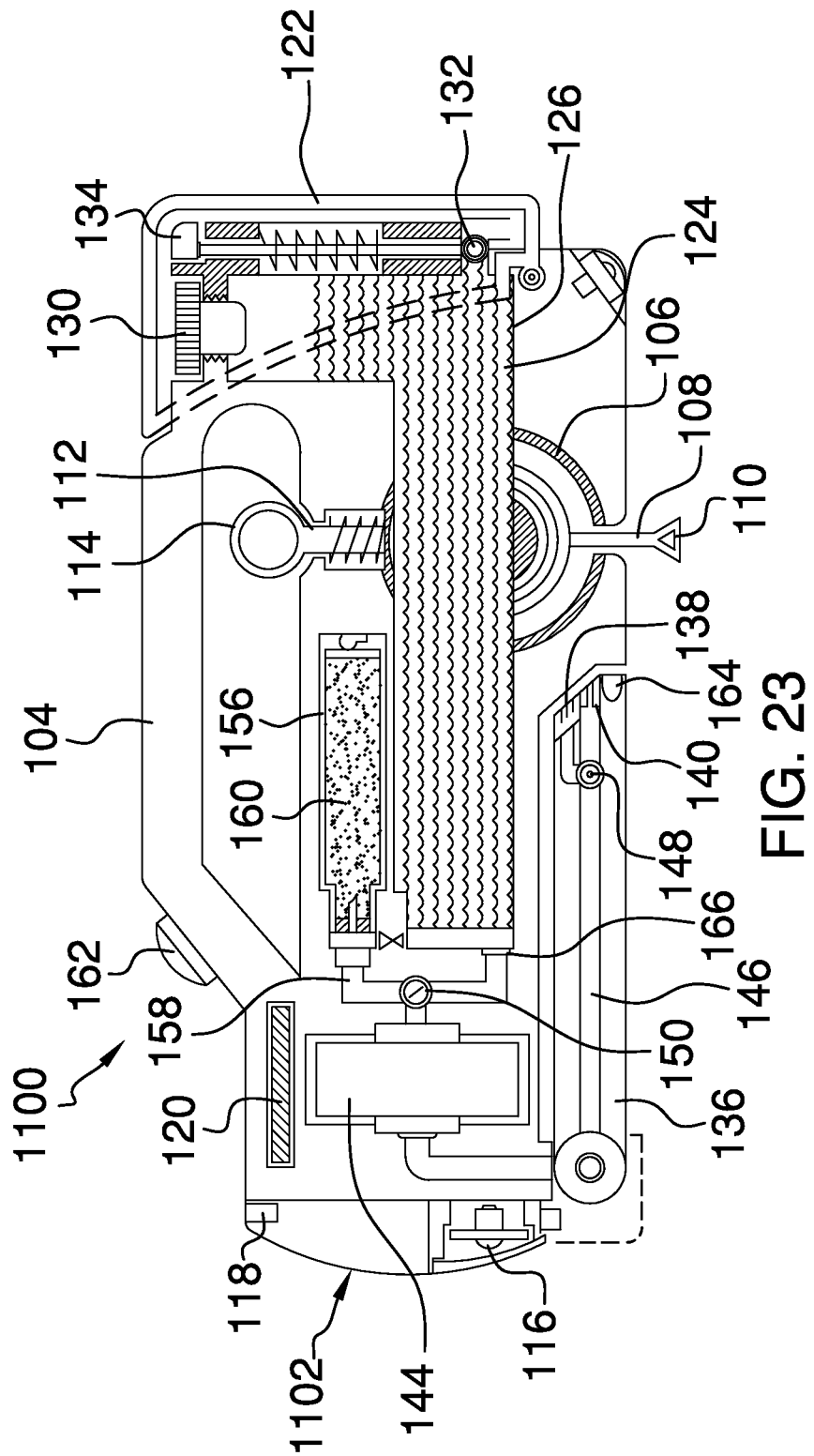
FIG. 23 is a diagrammatic view of a pet care device constructed in accordance with the principles of an alternative embodiment of the present invention.
Figure 24:
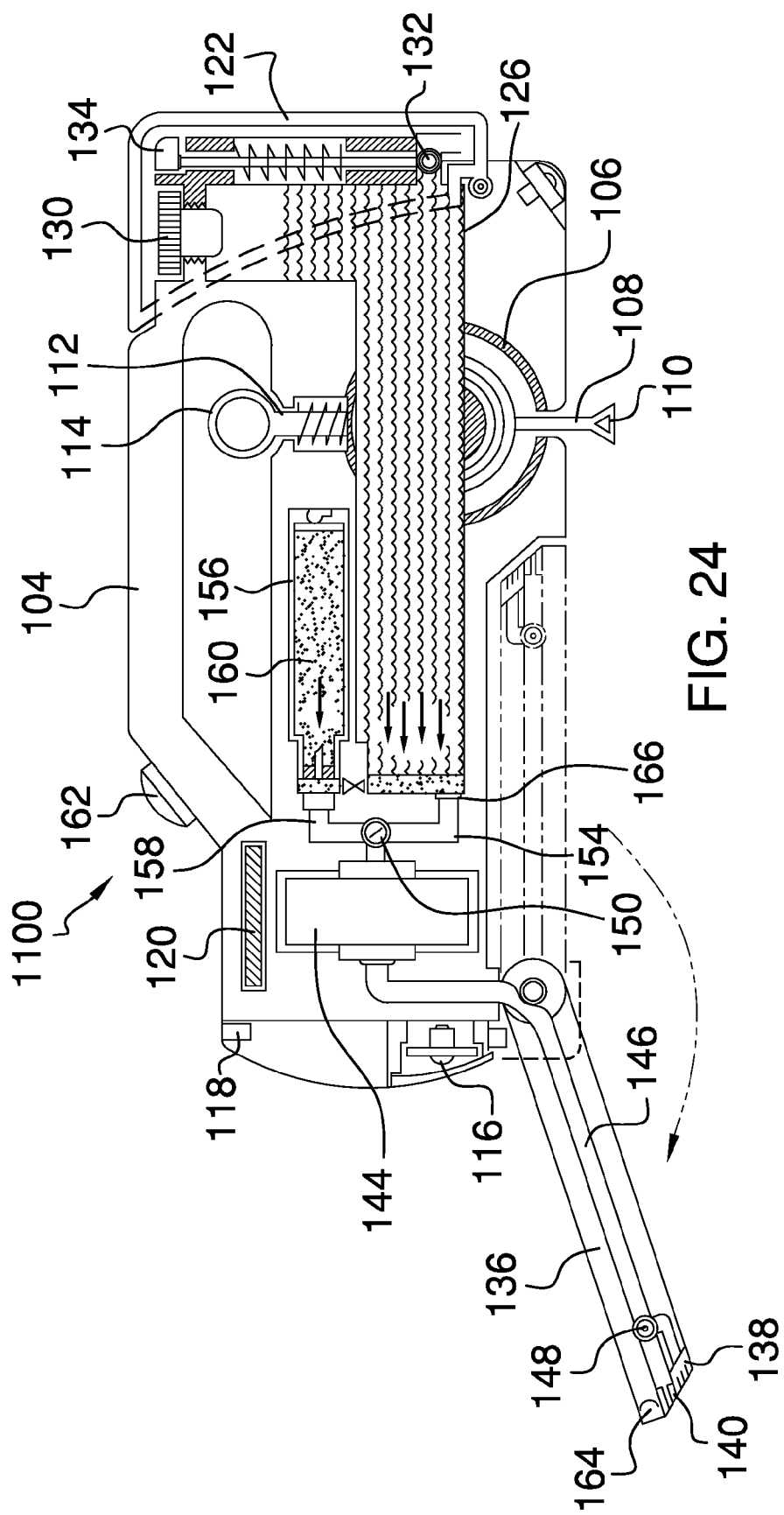
FIG. 24 is a diagrammatic view of the pet care device of FIG. 23, showing the device in an alternative configuration.
Figure 25:
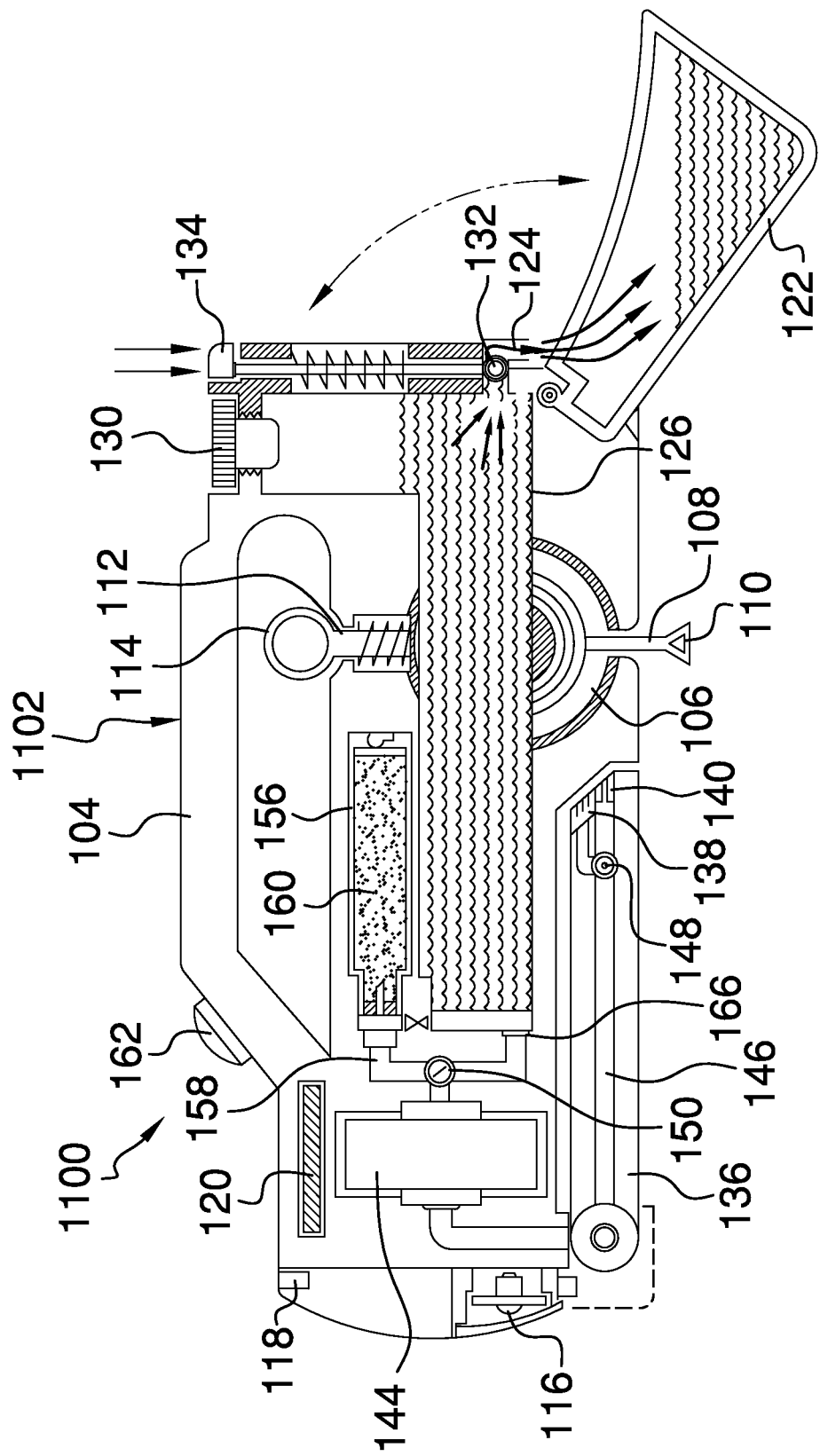
FIG. 25 is a diagrammatic view of the pet care device of FIG. 23, showing an integrated water bowl in-use.
Figure 26:
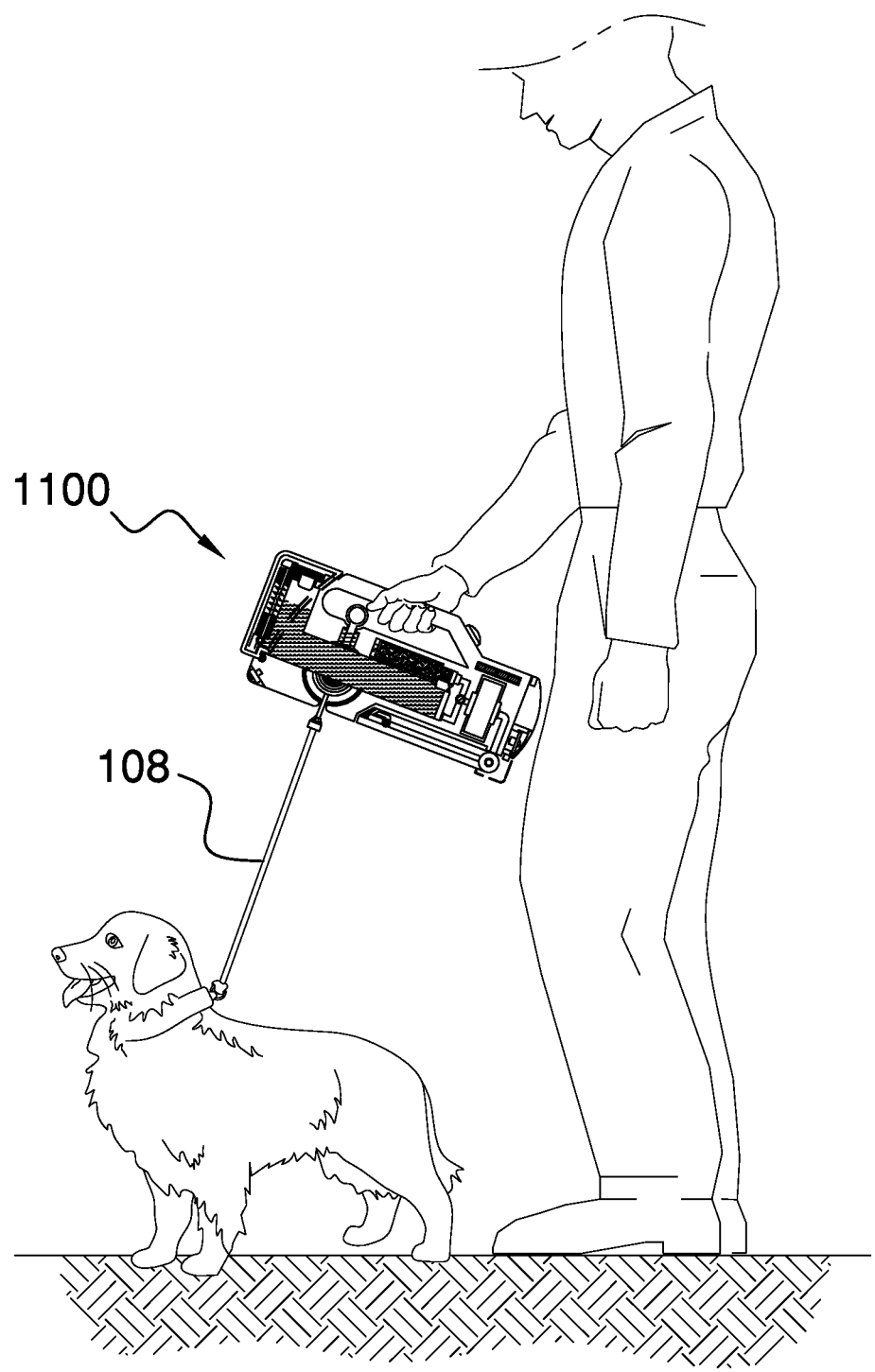
FIG. 26 is a diagrammatic view of the pet care device of FIG. 23, showing the device in-use with a dog attached to a leash of the device.
Figure 27:
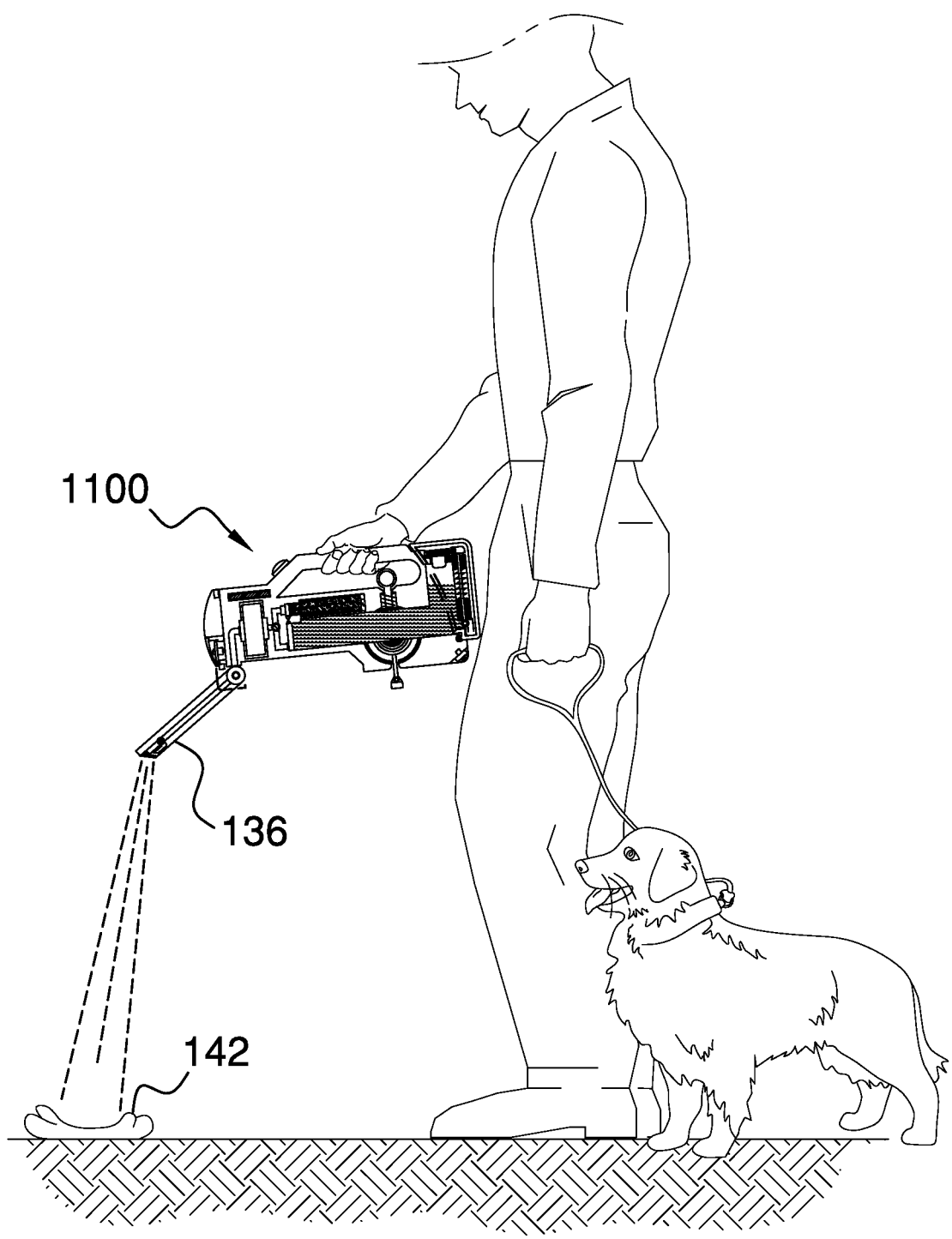
FIG. 27 is a diagrammatic view of the pet care device of FIG. 23, showing the device in a mode of operation treating pet waste.
Figure 28:
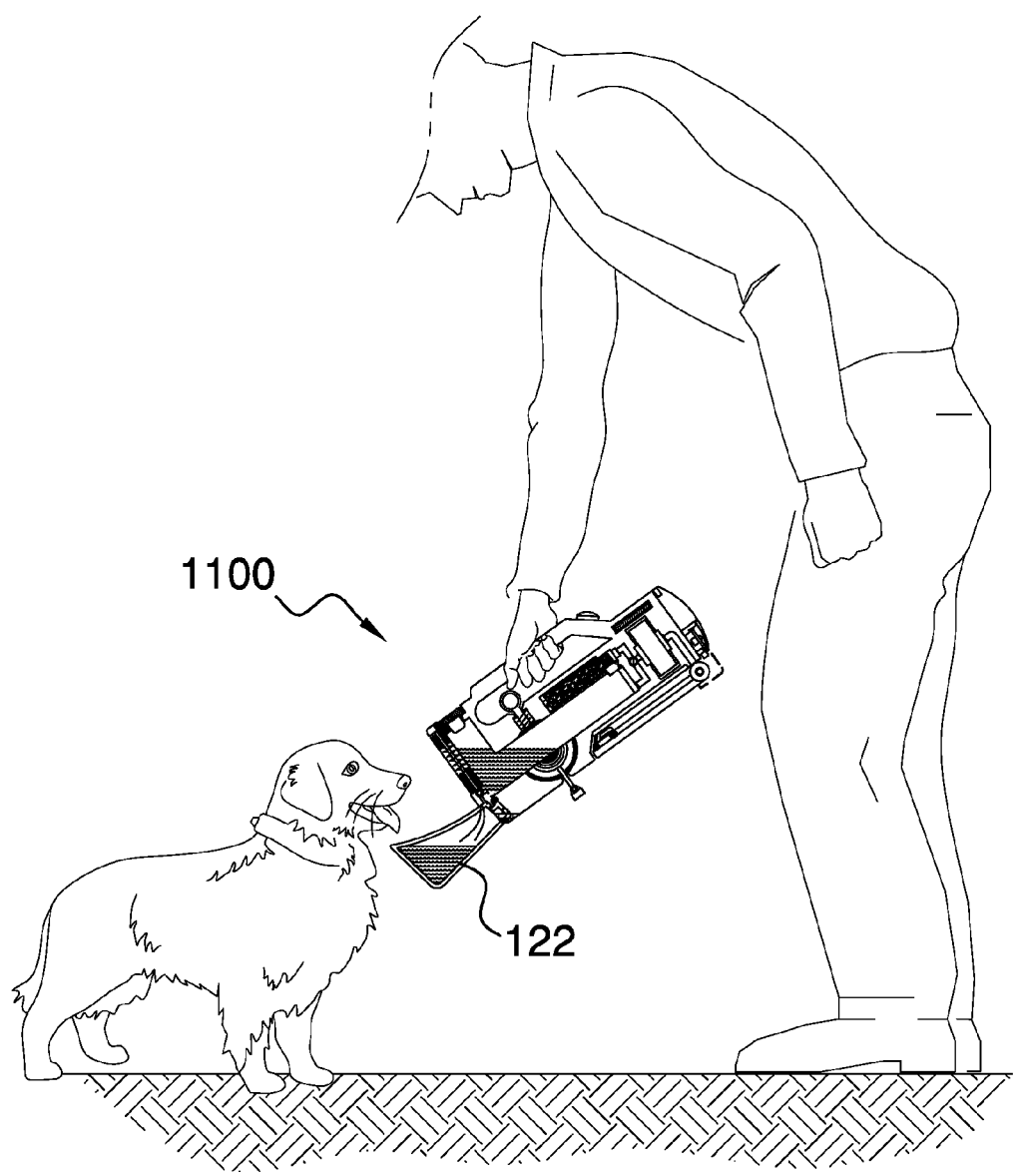
FIG. 28 is a diagrammatic view of the pet care device of FIG. 23, showing the integrated water bowl in-use.

Device 1100 is illustrated with the spray wand 136 retracted in FIG. 23 and illustrated with the spray wand extended in FIG. 24. FIG. 25 illustrates device 1100 with the water bowl 122 extended and being filed with water 124 from container 126 by operating valve 132 by operator 134. FIG. 26 illustrates device 1100 in-use with a pet attached to the leash 108. FIG. 27 illustrates device 1100 in-use with the spray wand 136 extended and treating a target 142. Finally, FIG. 28 illustrates device 1100 in-use with the water bowl 122 extended and a pet drinking water from the bowl.

Figure 29:
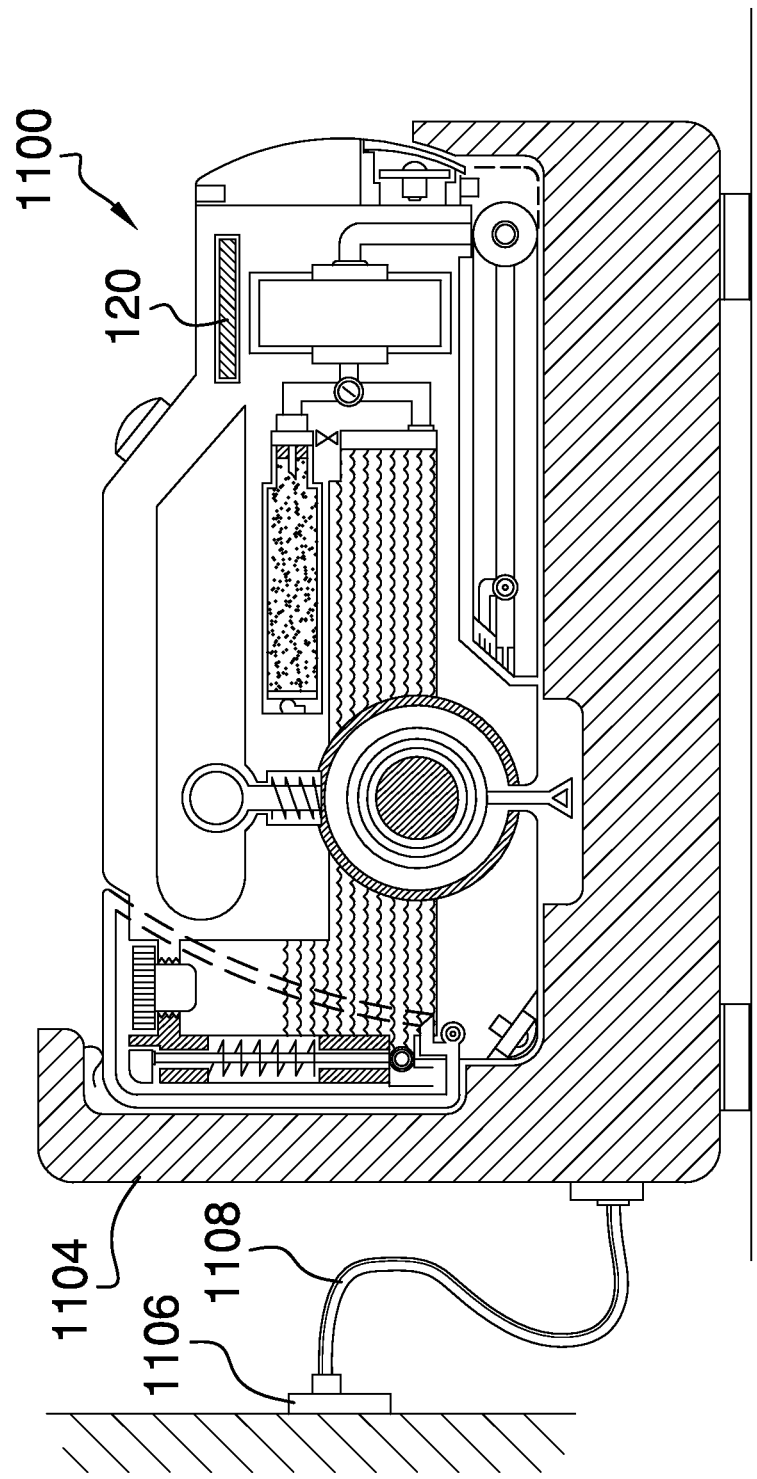
FIG. 29 is a diagrammatic view of the pet care device of FIG. 23, showing the device received by a charging dock.

With reference to FIG. 29, there is diagrammatically illustrated device 1100 received by storage/charging dock 1104 for storing the device and for charging the rechargeable battery 120. Dock 1104 is connected to a standard electrical outlet 1106 by a power cable 1108. Dock 1104 is configured to removably receive and retain device 1100 when not in use. Although device 1100 is illustrated in connection with dock 1104, it is to be understood that any of the embodiments of the present invention may also be used in connection with dock 1104.

Figure 30:
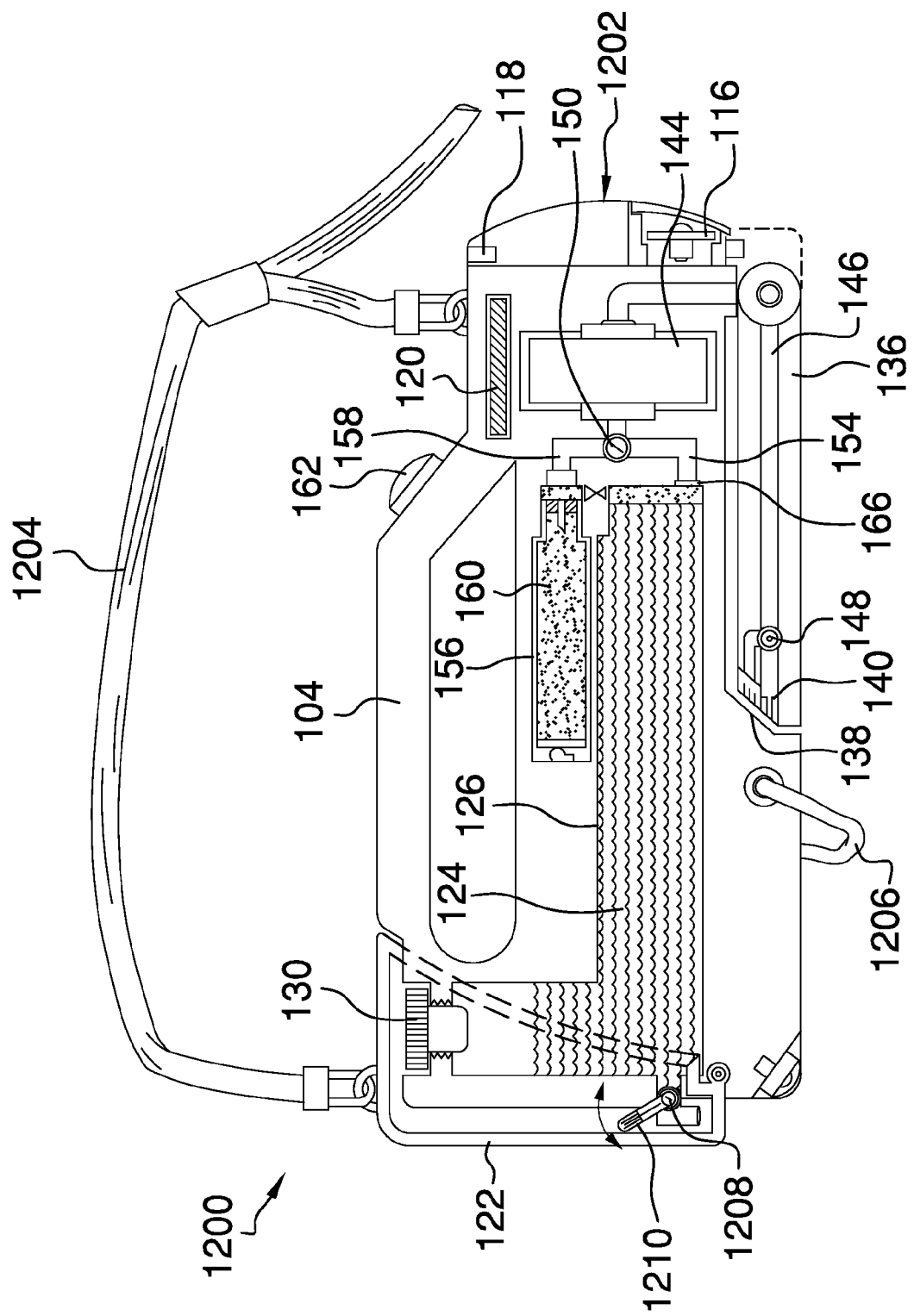
FIG. 30 is a diagrammatic view of a pet care device constructed in accordance with the principles of an alternative embodiment of the present invention.

With reference to FIG. 30, there is diagrammatically illustrated a pet care device 1200 in accordance with an embodiment of the present invention, wherein like reference numbers refer to similar elements previously discussed. Device 1200 includes housing 1202, a shoulder strap 1204 that is connected at opposite ends to housing 1202, and a leash holder 1206. Device 1200 eliminates the retractable leash assembly 106 and replaces valve 132 and valve operator 134 by an alternatively configured valve 1208 that includes a lever 1210.

Figure 31:
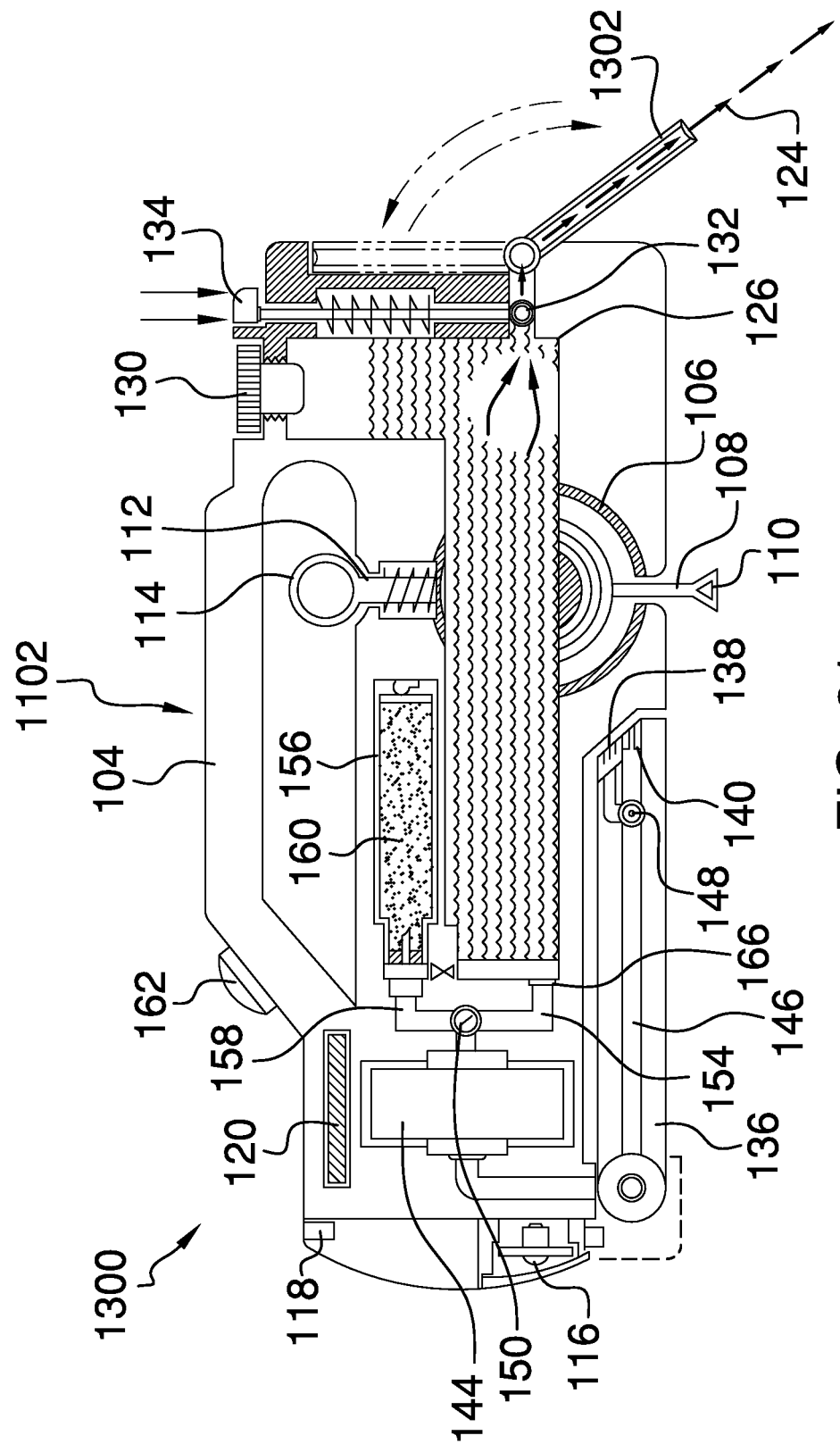
FIG. 31 is a diagrammatic view of a pet care device constructed in accordance with the principles of an alternative embodiment of the present invention.

With reference to FIG. 31, there is diagrammatically illustrated a pet care device 1300 in accordance with an embodiment of the present invention, wherein like reference numbers refer to similar elements previously discussed. Device 1300 replaces water bowl 122 of device 1100 with a spout 1302 that is pivotally attached to housing 1102 for rotation toward and away from the housing between retracted and extended positions. Spout 1302 is fluidically connected to container 126 and valve 132 is operated to allow water 124 to flow from the container and through spout 1302. To this end, a pet could drink water directly from spout 1302 or a secondary bowl or dish could be filed for the pet to drink from.

Figure 32:
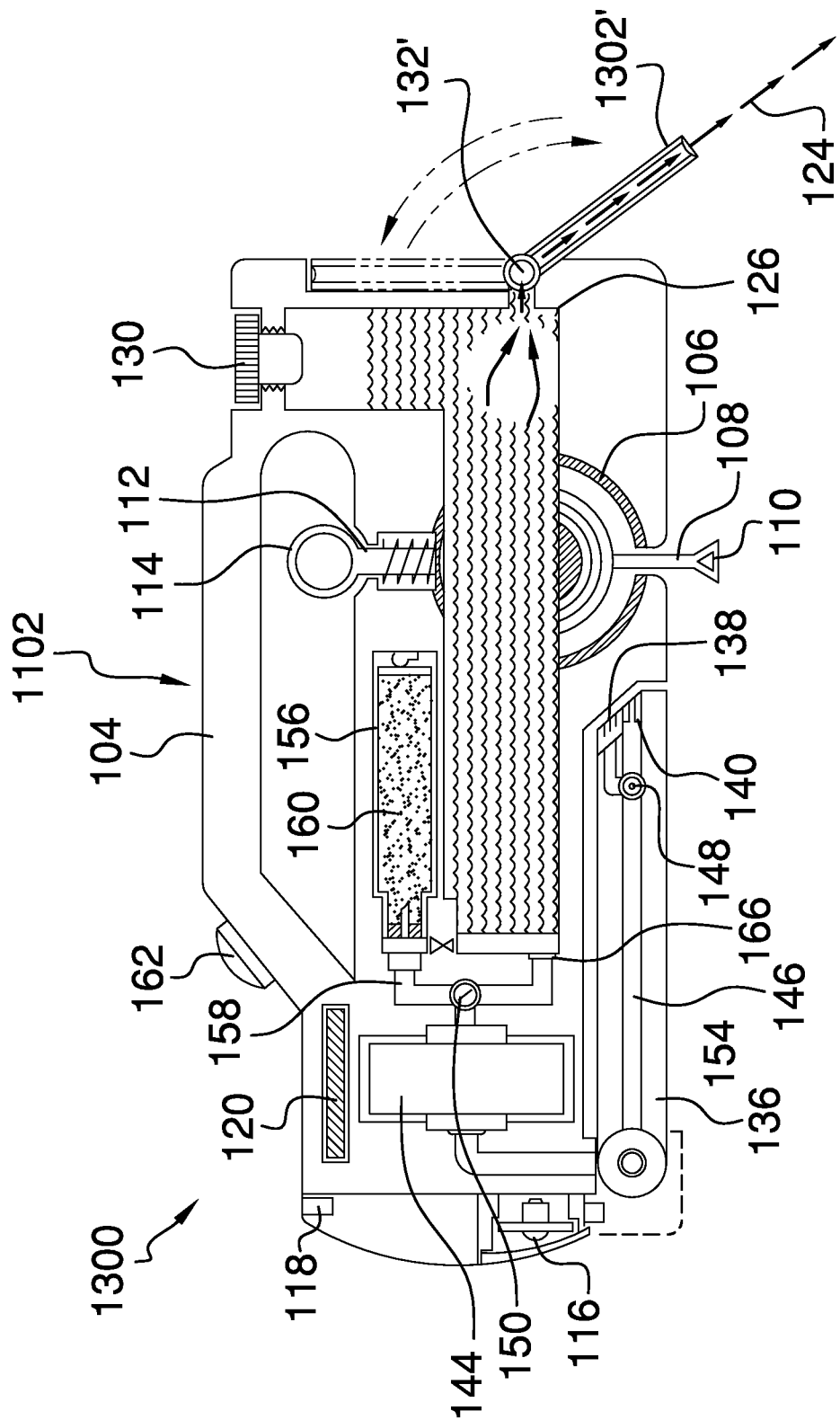
FIG. 32 is a diagrammatic view of a pet care device constructed in accordance with the principles of an alternative embodiment of the present invention.

With reference to FIG. 32, device 1300 is diagrammatically illustrated with an alternative spout 1302' and an alternative valve 132'. In this configuration, valve 132' is integrated with spout 1302' such that rotating the spout from its retracted position into its extended position operates valve 132' from a closed position into an open position, respectively.

Figure 33:
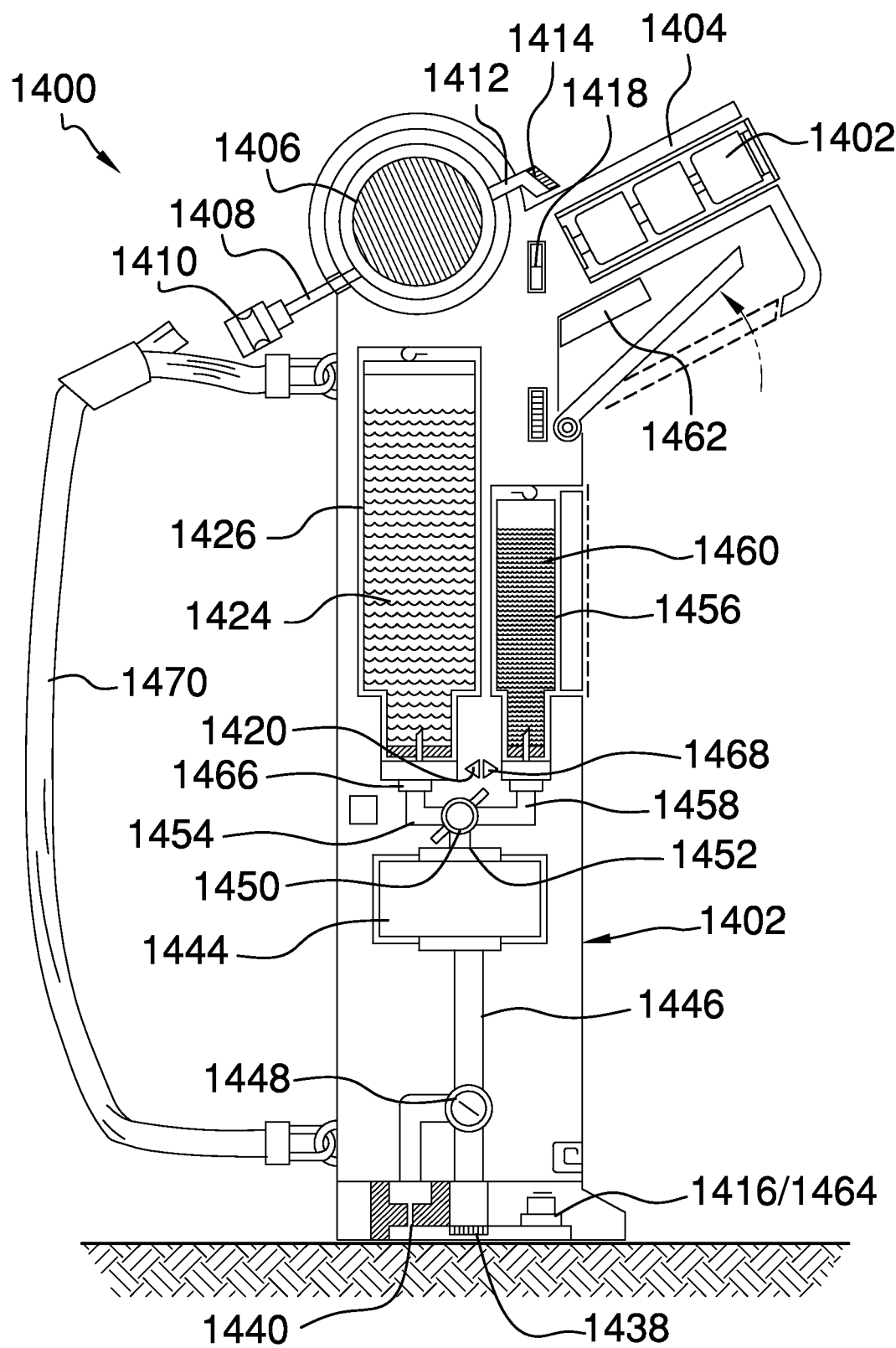
FIG. 33 is a diagrammatic view of a pet care device constructed in accordance with the principles of an alternative embodiment of the present invention.
Figure 34:
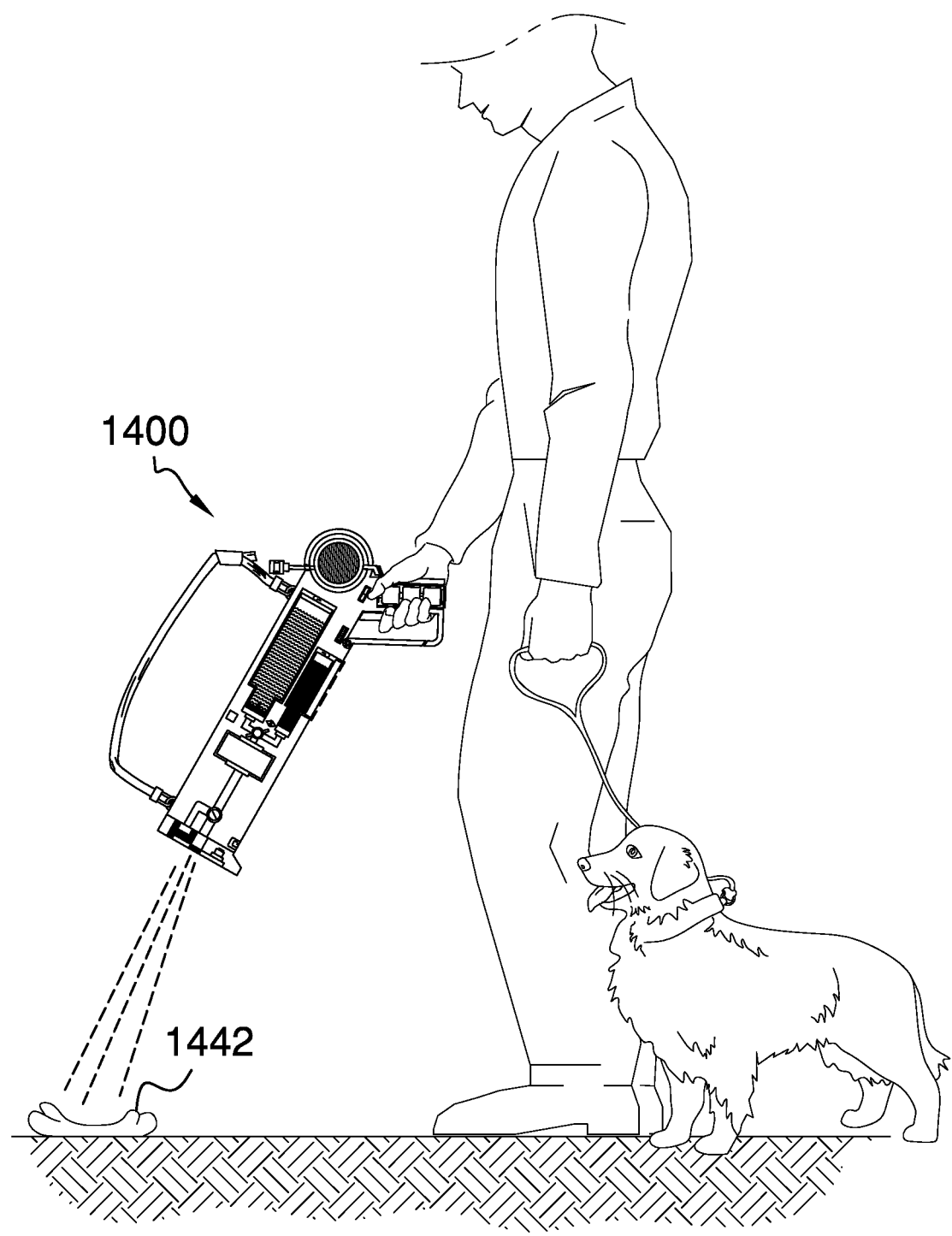
FIG. 34 is a diagrammatic view of the pet care device of FIG. 33, showing the device in a mode of operation treating pet waste.
Figure 35:
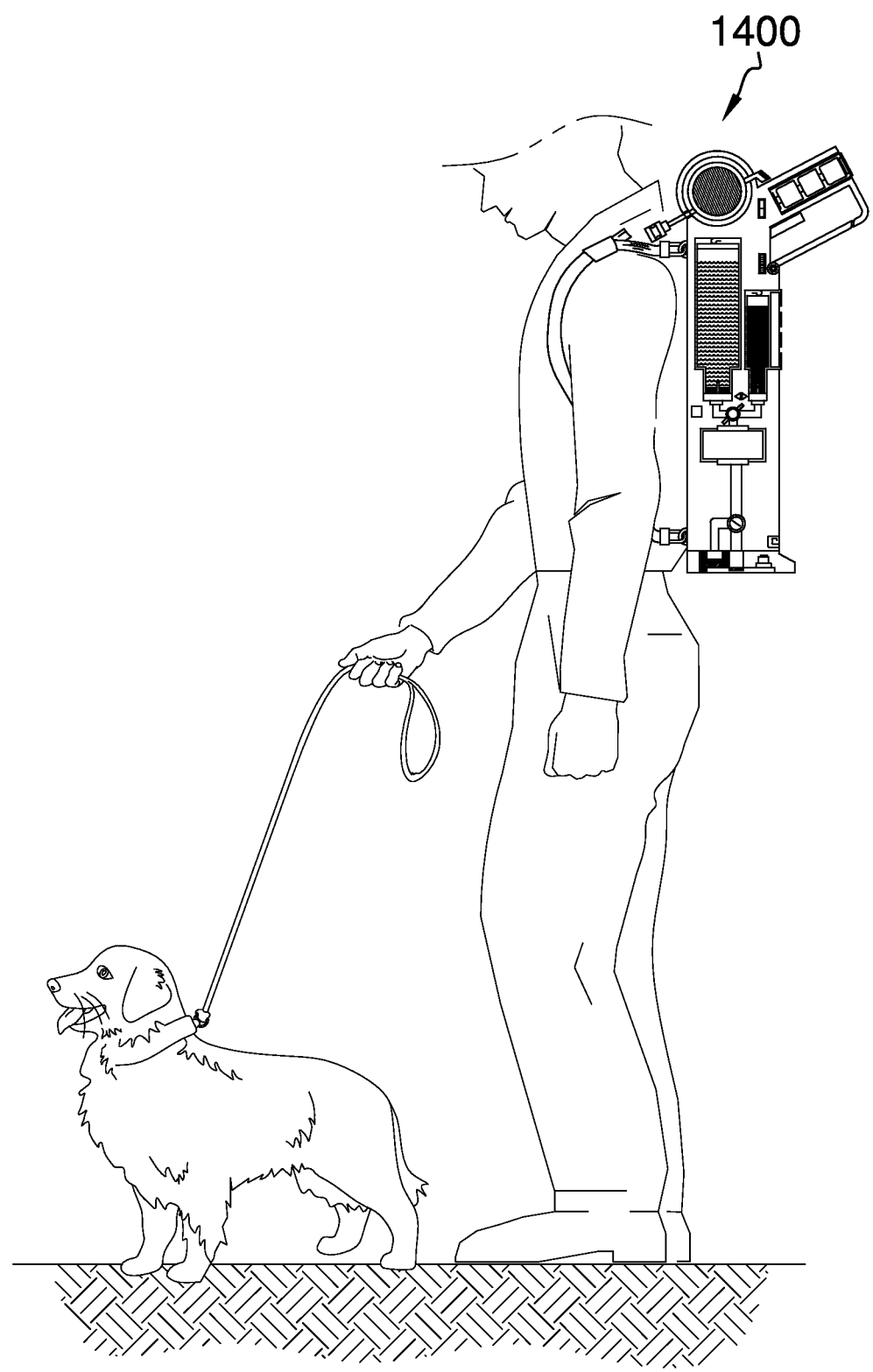
FIG. 35 is a diagrammatic view of the pet care device of FIG. 33, showing the device being carried on the back of a user.

With reference to FIGS. 33 through 35, there is diagrammatically illustrated a pet care device 1400 in accordance with an embodiment of the present invention. Device 1400 provides a pet owner with necessary pet care items when walking the pet, for example, on a roadway or in park. Device 1400 includes a casing or housing 1402 that contains the various components of the device and which is configured to be grasped at handle 1404 and carried by a user while walking a pet (FIG. 34).

A conventional retractable leash assembly 1406 is contained within a top portion of housing 1402 and includes a retractable leash 1408 that is fitted with a coupling 1410 for attachment to a collar and a control lever or the like 1412 for operating the extension and retraction of the leash 108. Lever 1412 is disposed approximate handle 1404 and includes a finger button 1414 permitting a user to operate lever 1412 by a finger while grasping handle 1404.

A flash light 1416 is positioned at bottom end of housing 1402 and is operated by a button or switch 1418 to turn the flash light on-and-off as desired by the user. A source of electrical power, such as rechargeable battery 1420 provides the necessary electrical power to operate the flash light 1416.

A quantity of fresh water 1424 is contained or held within fresh water container 1426 that may be integral with housing 1402 or removably received by the housing. A pair of nozzles 1438, 1440 are disposed at the bottom of housing 1402 and are configured to selectively spray fluid from the spray wand at a target 1442, such as, for example, animal excrement left by the user's pet. Nozzle 1438 is low pressure nozzle configured to saturate the target with a fluid and nozzle 1440 is a high pressure nozzle configured to wash away the target. Alternatively, nozzles 1438, 1440 could be replaced by a single nozzle.

Nozzles 1438, 1440 are fluidically connected to the outlet of pump 1444 (carried by housing 1402) by fluid conduit 1446. Valve 1448 may be provided to selectively connect either nozzle 1438 or nozzle 1440 to fluid conduit 1446 to spray fluid flowing through the conduit.

The inlet of pump 1444 is fluidically connected to a selector or proportional valve 1450 by conduit 1452. The proportional valve 1450 is fluidically connected to fresh water container 1426 by conduit 1454 and anti-siphon valve 1466 and is fluidically connected to a chemical concentrate container 1456 by conduit 1458. It is to be understood that all fluid conduits 1446, 1452, 1454, 1458 may be flexible or ridged pipes or hoses or could be integrally formed and defined by housing 1402. Proportional valve 1450 is operated to proportion the quantity of chemical concentrate 1460 is mixed with fresh water 1424 when pump 1444 is operated to spray fluid. The proportional valve 1450 can be configured to have predestinated positions that correspond to various mixing ratios. And the proportional valve 1450 is further configured to allow only pumping of fresh water 1424.

The chemical concentrate container 1456 is removably received by housing 1402 and can include a seal that is puncture when received by the housing to fluidically connect the chemical concentrate container to conduit 1458 to receive the chemical concentrate 1460 for pumping and dispensing. The fresh water container 1426 may similarly operate in the removable container configuration, as illustrated.

Pump 1444 is electrically powered by battery 1420 and pump switch or button 1462 is operated by the user to turn the pump off and on. A safety switch may be included to prevent operation of the pump 1444 during undesired periods. Battery 1420 may be recharged by connecting a power cable (not shown) to device 1400 by known methods.

Device 1400 may also include a ultra-violet lamp 1464 disposed at the bottom of housing 1402. The U.V. lamp 1464 is powered by battery 1420 and will only operate during desired periods, such as, for example when treating waste.

In more advanced embodiments, device 1400 may include a fluid sensor 1468 that detects when chemical concentrate is available and a fluid sensor 1470 that detects when fresh water is available. In certain embodiments, a PLC or the like is connected to fluid sensors 1468 and 1470 and will prevent the operation of the spray function when sensor 1468 does not detect chemical concentrate or when sensor 1470 does not detect fresh water. In such as instance, pump 1444 is prevented from being operated. Device 1400 may also include an LCD display or other suitable indicator display to provide a visual indication to the user of the status of the device, for example battery power, whether there is supply of fresh water 1424 or chemical concentrate 1460 available, and when certain functions of the device are available for operation.

Additionally, valves 1432, 1448, 1450 may be electrically operated valves as opposed to manually operated valves. The valves and pump could be operated according to preprogrammed modes of operation. For example, the device 1400 could be programmed to operate in a disinfection mode where the device would operate valves 1448 and 1450 and pump 1444 according to a desired timed sequence to disinfect and flush waste from a surface. The operation of device 1400 is apparent from the above description and thus operation of the device does not require a detailed explanation herein.

Device 1400 may also include a shoulder strap 1470 that is attached at opposite ends to housing 1402 to permit a user to carrier the device by his/her shoulder, as best seen in FIG. 35.

Figure 36:
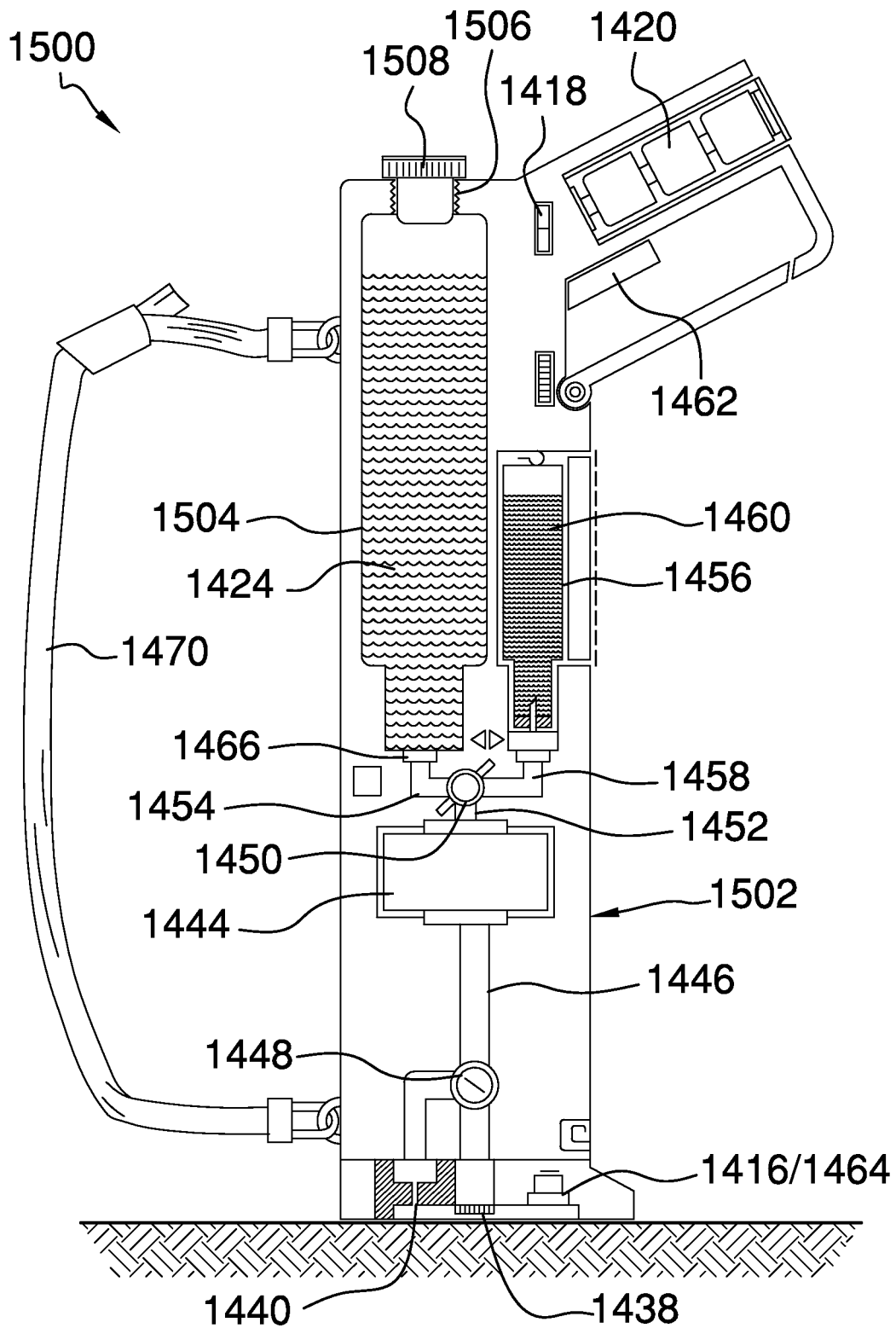
FIG. 36 is a diagrammatic view of a pet care device constructed in accordance with the principles of an alternative embodiment of the present invention.
Figure 37:
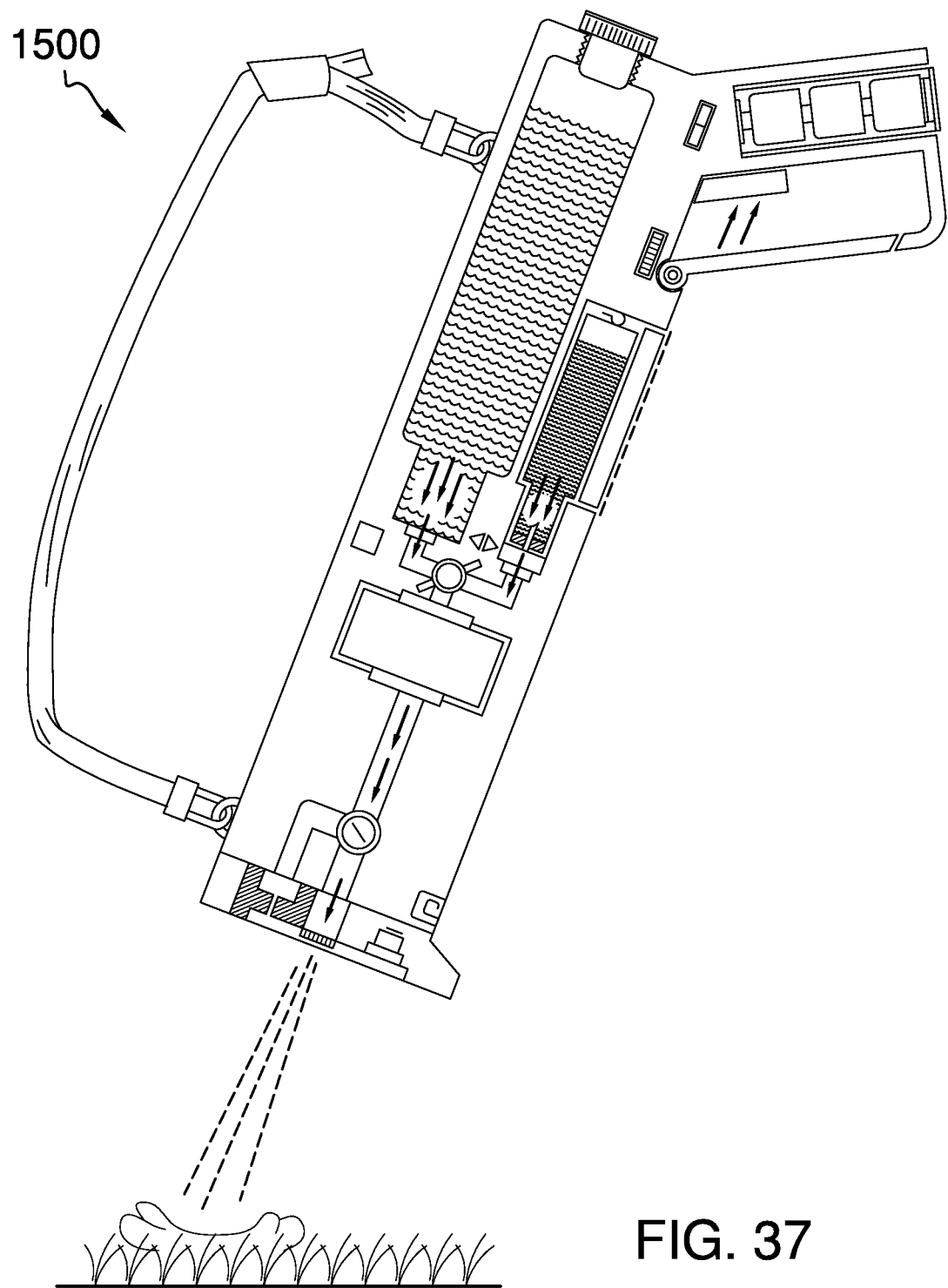
FIG. 37 is a diagrammatic view of the pet care device of FIG. 36, showing the device in a mode of operation treating pet waste.
Figure 38:
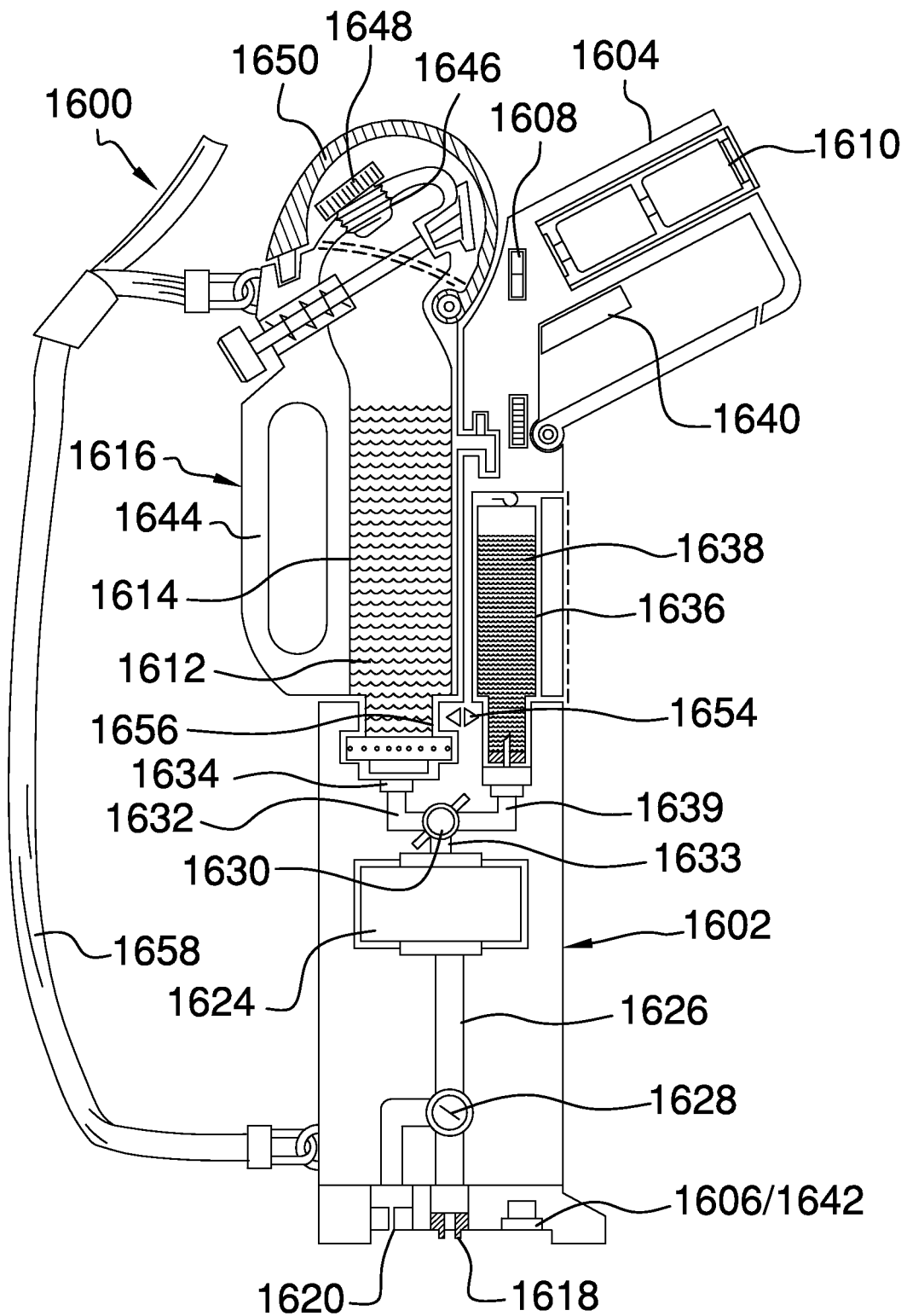
FIG. 38 is a diagrammatic view of a pet care device constructed in accordance with the principles of an alternative embodiment of the present invention.

With reference to FIGS. 36 and 37, there is diagrammatically illustrated a pet care device 1500 in accordance with an embodiment of the present invention, wherein like reference numbers refer to similar elements previously discussed. Device 1500 includes housing 1502 that defines an integral water container 1504 that replaces the removable water container 1426 of device 1400. Container 1504 includes a fill opening or neck 1506 for filling the container with fresh water. A lid 1508 is removably attachable to container 1504 to seal the fill opening 1506. Additionally, device 1500 does not include the retractable leash assembly 1406 of device 1400. FIG. 37 illustrates device 1500 in-use treating waste. The operation of device 1500 is apparent from the above description and thus operation of the device does not require a detailed explanation herein.

With reference to FIGS. 38 through 42, there is diagrammatically illustrated a pet care device 1600 in accordance with an embodiment of the present invention. Device 1600 provides a pet owner with necessary pet care items when walking the pet, for example, on a roadway or in park. Device 1600 includes a casing or housing 1602 that contains the various components of the device and which is configured to be grasped at handle 1604 and carried by a user while walking a pet.

A flash light 1606 is positioned at bottom end of housing 1602 and is operated by a button or switch 1608 to turn the flash light on-and-off as desired by the user. A source of electrical power, such as rechargeable battery 1610, provides the necessary electrical power to operate the flash light 1606.

A quantity of fresh water 1612 is contained or held within fresh water container 1614 that may be integral with module housing 1616 that is removably received by housing 1602. A pair of nozzles 1618, 1620 are disposed at the bottom of housing 1602 and are configured to selectively spray fluid from the housing at a target 1622, such as, for example, animal excrement left by the user's pet. Nozzle 1618 is low pressure nozzle configured to saturate the target with a fluid and nozzle 1620 is a high pressure nozzle configured to wash away the target. Alternatively, nozzles 1618, 1620 could be replaced by a single nozzle.

Nozzles 1618, 1620 are fluidically connected to the outlet of pump 1624 (carried by housing 1602) by fluid conduit 1626. Valve 1628 may be provided to selectively connect either nozzle 1618 or nozzle 1620 to fluid conduit 1626 to spray fluid flowing through the conduit.

The inlet of pump 1624 is fluidically connected to a selector or proportional valve 1630 by conduit 1633. The proportional valve 1630 is fluidically connected to fresh water container 1614 by conduit 1632 and anti-siphon valve 1634 and is fluidically connected to a chemical concentrate container 1636 by conduit 1639. It is to be understood that all fluid conduits 1626, 1632, 1633, and 1639 may be flexible or ridged pipes or hoses or could be integrally formed and defined by housing 1602. Proportional valve 1630 is operated to proportion the quantity of chemical concentrate 1638 is mixed with fresh water 1612 when pump 1624 is operated to spray fluid. The proportional valve 1630 can be configured to have positions that correspond to various mixing ratios. And the proportional valve 1630 is further configured to allow only pumping of fresh water 1612.

The chemical concentrate container 1636 is removably received by housing 1602 and can include a seal that is puncture when received by the housing to fluidically connect the chemical concentrate container to conduit 1630 to receive the chemical concentrate 1638 for pumping and dispensing.

Pump 1624 is electrically powered by battery 1610 and pump switch or button 1640 is operated by the user to turn the pump off and on. A safety switch may be included to prevent operation of the pump 1624 during undesired periods. Battery 1610 may be recharged by connecting a power cable (not shown) to device 1600 by known methods.

Device 1600 may also include a ultra-violet lamp 1642 disposed at the bottom of housing 1602. The U.V. lamp 1642 is powered by battery 1610 and will only operate during desired periods, such as, for example when treating waste.

Figure 39:
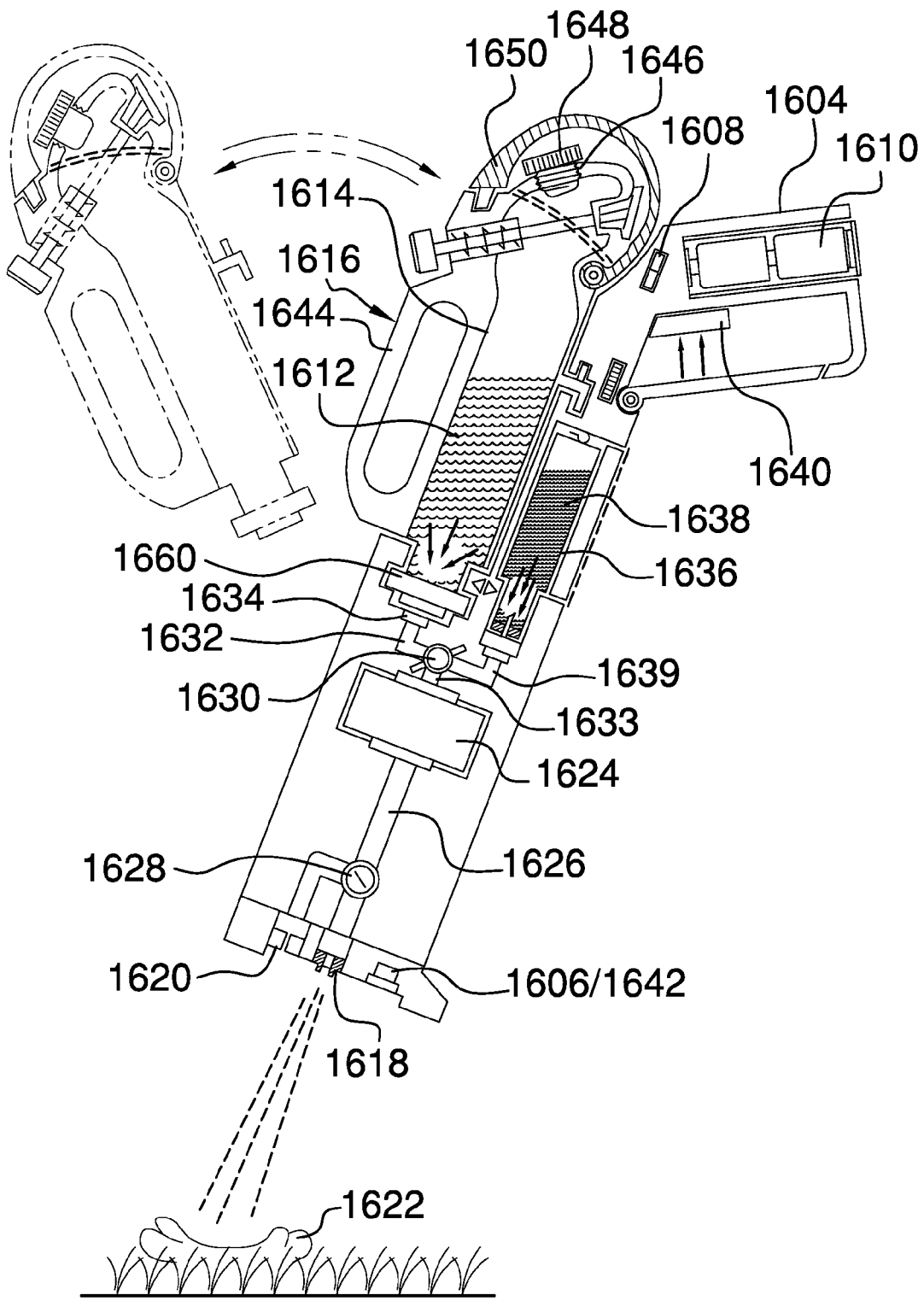
FIG. 39 is a diagrammatic view of the pet care device of FIG. 38, showing the device in a mode of operation treating pet waste.
Figure 40:
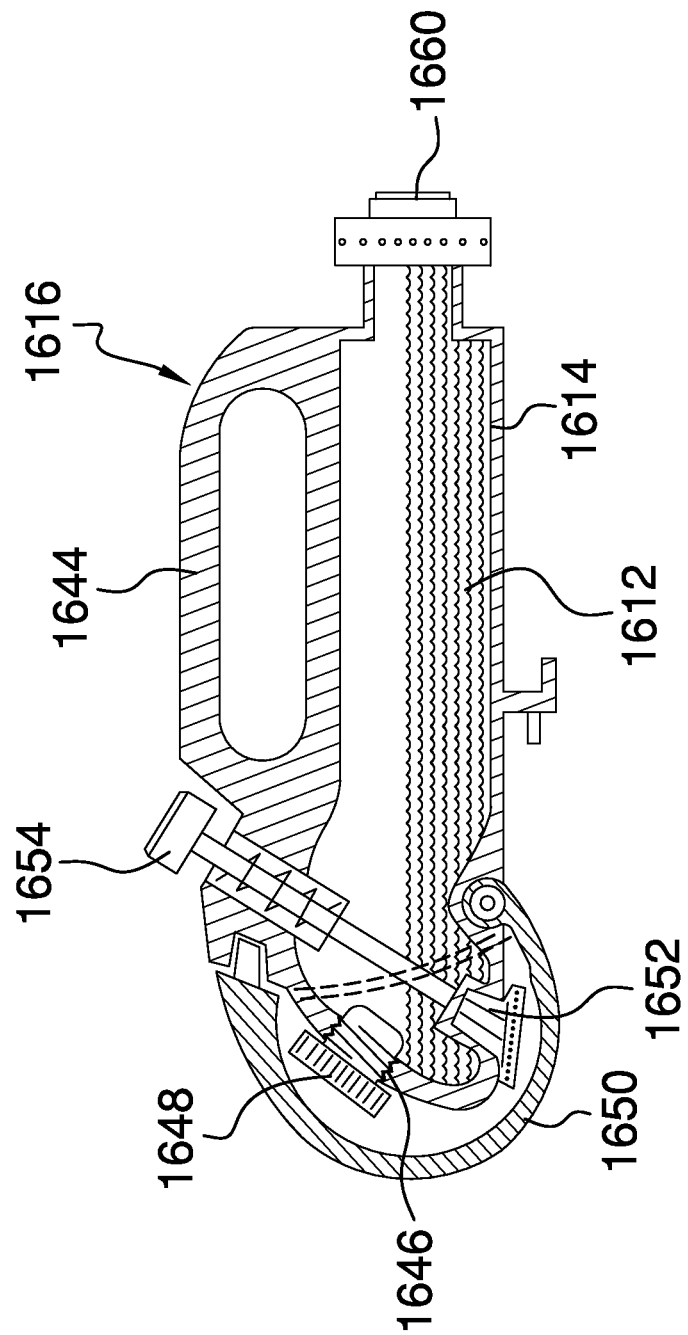
FIG. 40 is a diagrammatic view of a module housing of the pet care device of FIG. 38, showing a water bowl in a retracted position.

As discussed above, module housing 1616 is removable from housing 1602, as best illustrated in FIG. 39, and may be used separately to provide a water bottle during outings. Module housing 1616 includes a handle 1644 for user to grasp to hold the module housing.

Figure 42:
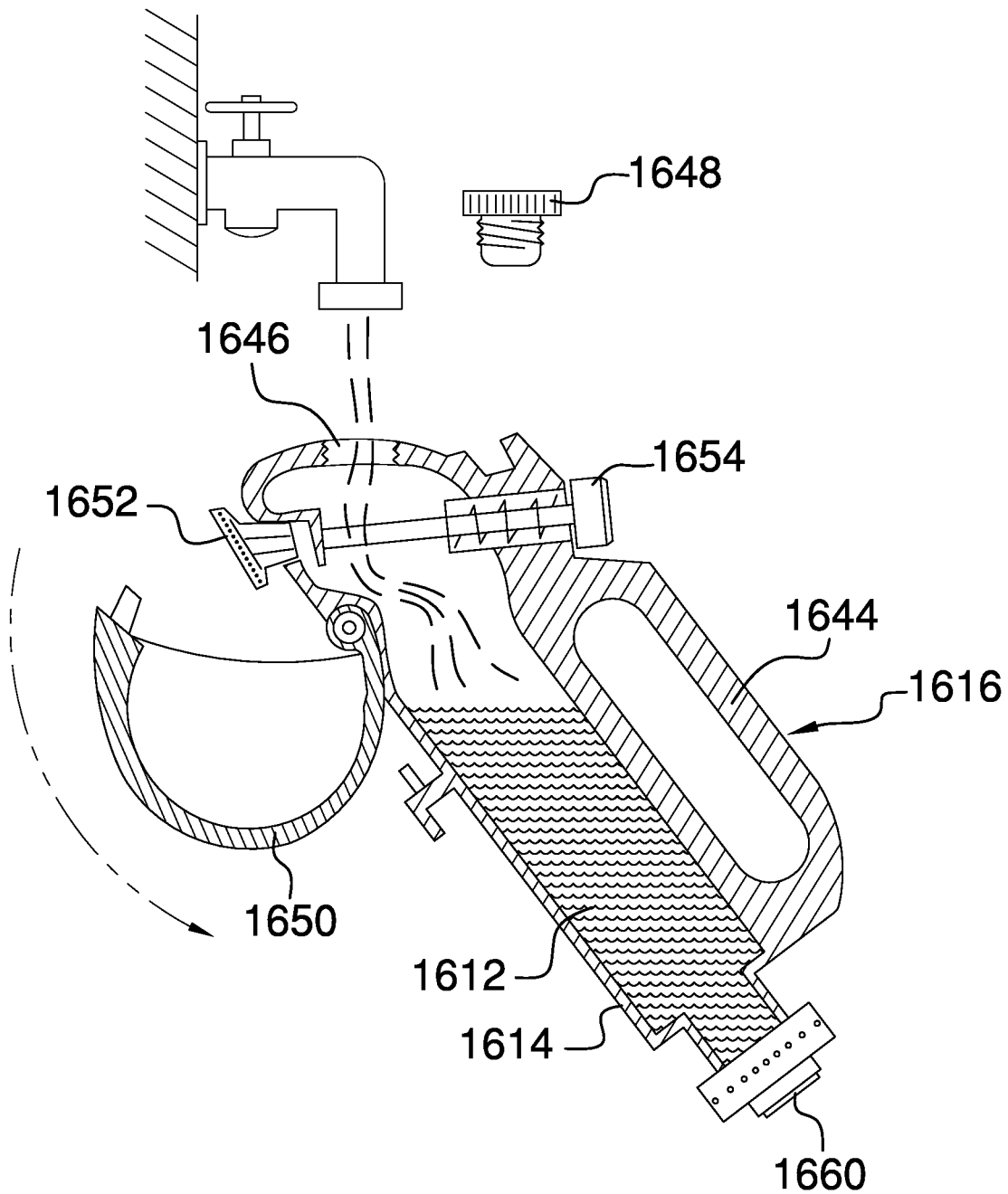
FIG. 42 is a diagrammatic view of a module housing of the pet care device of FIG. 38, showing a fresh water container being filled with water.

Fresh water 1612 is contained or held within fresh water container 1614 that is integral with module housing 1616. Container 1614 includes a fill opening or neck 1646 for filling the container with fresh water (FIG. 42). A lid 1648 is removably attachable to container 1614 to seal the fill opening 1646.

Module housing 1616 further includes an automatic valve 1660 that operates to fluidically connect the fresh water container 1614 to conduit 1632 when the module housing is received by housing 1602. And valve 1660 further operates to seal the fresh water container 1614 when the module housing is removed from the housing 1602.

Figure 41:
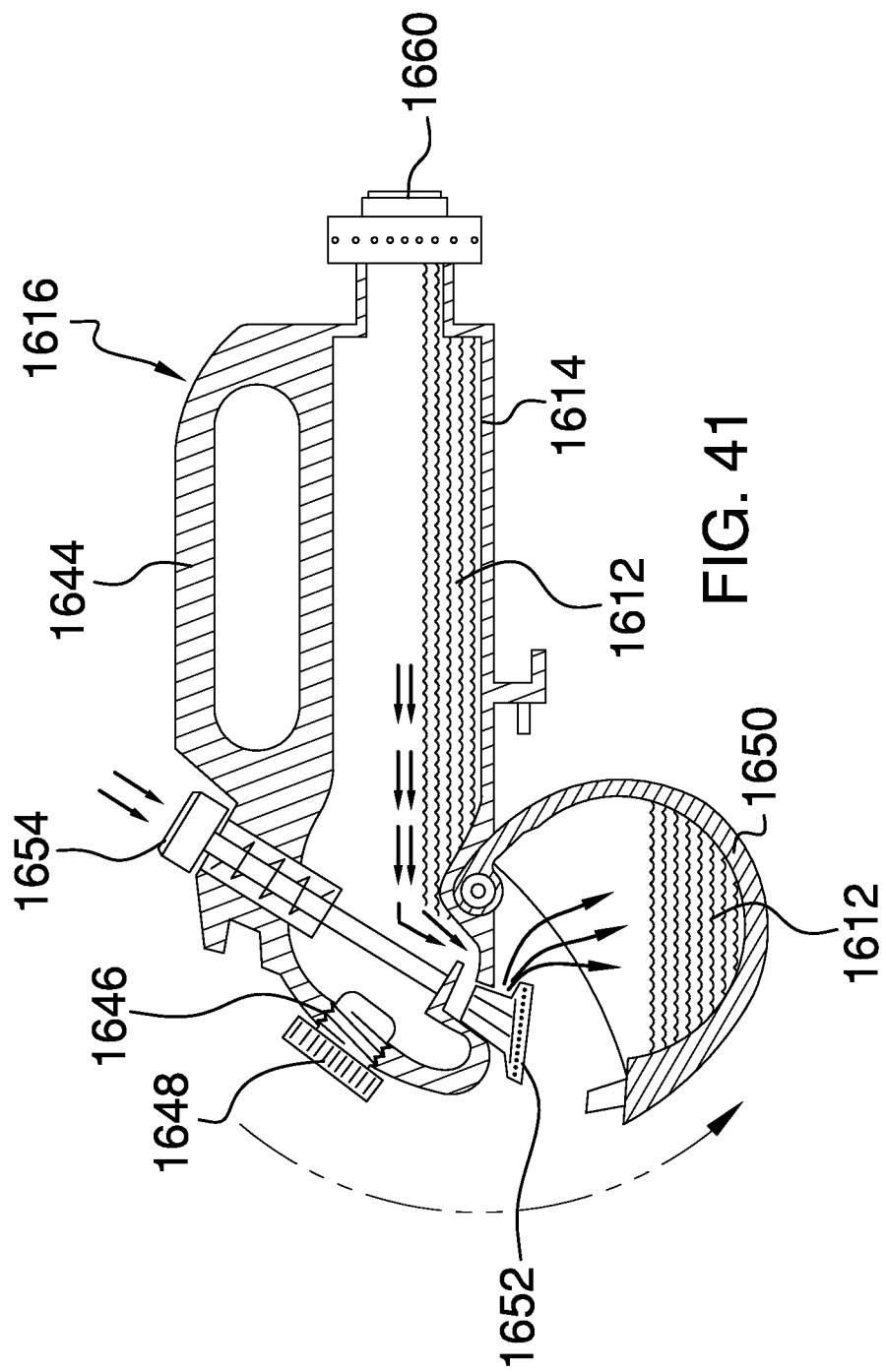
FIG. 41 is a diagrammatic view of a module housing of the pet care device of FIG. 38, showing a water bowl in an extended position.

A water bowl 1650 is pivotally attached to an end of module housing 1616 and is rotatable toward and away from the housing between a stored position (FIG. 40) and an extended position (FIG. 41). In the stored position the water bowl 1650 is configured to partially wrap-around or enclose a portion of the end of module housing 1616. In the extended position the water bowl 1650 is positioned such that a user, while grasping handle 1644, is able to present the water bowel to the pet for drinking.

As best seen in FIG. 41, a valve 1652 is fluidically connected to container 1614 and is operated to dispense fresh water 1612 into the extended water bowl 1650. An operator 1654 is operatively connected to valve 1652 to open and close the valve to fill the water bowl.

In more advanced embodiments, device 1600 may include a fluid sensor 1654 that detects when chemical concentrate is available and a fluid sensor 1656 that detects when fresh water is available. In certain embodiments, a PLC or the like is connected to fluid sensors 1654 and 1656 and will prevent the operation of the spray function when sensor 1654 does not detect chemical concentrate or when sensor 1656 does not detect fresh water. In such as instance, pump 1624 is prevented from being operated. Device 1600 may also include an LCD display or other suitable indicator display to provide a visual indication to the user of the status of the device, for example battery power, whether there is supply of fresh water 1612 or chemical concentrate 1638 available, and when certain functions of the device are available for operation.

Additionally, valves 1628, 1630 may be electrically operated valves as opposed to manually operated valves. The valves and pump could be operated according to preprogrammed modes of operation. For example, the device 1600 could be programmed to operate in a disinfection mode where the device would operate valves 1628 and 1630 and pump 1624 according to a desired timed sequence to disinfect and flush waste from a surface. The operation of device 1600 is apparent from the above description and thus operation of the device does not require a detailed explanation herein.

Device 1600 may also include a shoulder strap 1658 (not shown in FIG. 39) that is attached at opposite ends the device to permit a user to carrier the device by his/her shoulder.

Figure 43:
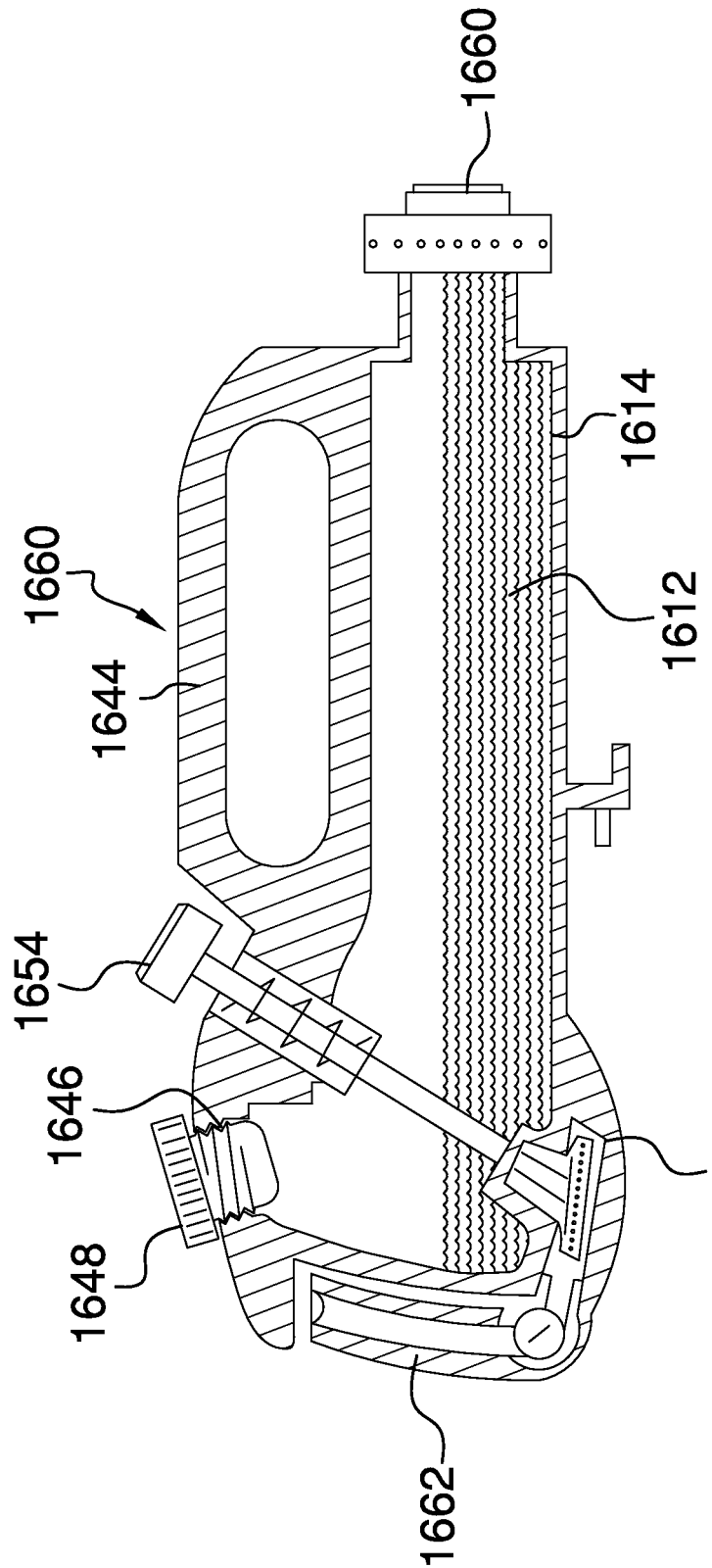
FIG. 43 is a diagrammatic view of an alternative embodiment of the module housing of the pet care device of FIG. 38, showing a spout in a retracted position.
Figure 44:
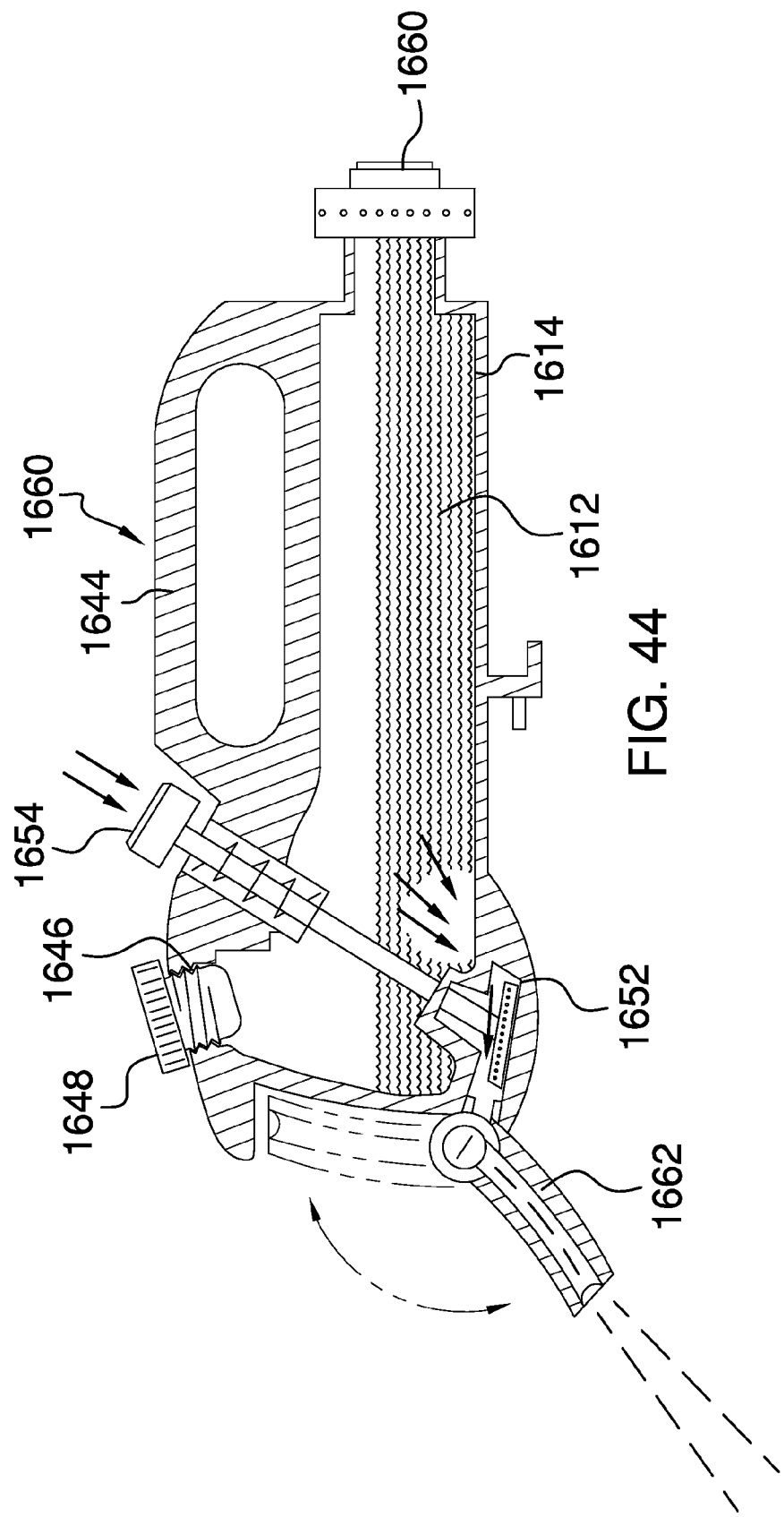
FIG. 44 is a diagrammatic view of an alternative embodiment of the module housing of the pet care device of FIG. 38, showing the spout in an extended position.

With reference to FIGS. 43 and 44, an alternative module housing 1660 is illustrated, wherein like reference numbers refer to similar elements previously discussed. In this embodiment, the water bowl 1650 is replaced by a spout 1662. Spout 1662 is pivotally attached to module housing 1660 for rotation between a stored position (FIG. 43) and an extended position (FIG. 44). Spout 1662 is fluidically connected to the water container 1614, and when in the extended position, valve 1652 may be operated to permit water 1612 to flow from the water container and through the spout to dispense the water.

A number of embodiments of the present invention have been described. Nevertheless, it will be understood that various modifications may be made without departing from the spirit and scope of the invention. Accordingly, other embodiments are within the scope of the following claims.

What is claimed is:

1. A pet care device comprising:
a housing, said housing defining a handle that is graspable by a user to hold said housing;
a retractable leash assembly carried by said housing;
a spray wand pivotally attached to a bottom of said housing and rotatable between extended and retracted positions;
a pump carried by said housing;
one or more fluid nozzles disposed at an end of said spray wand, each of said fluid nozzles fluidically connected to a outlet of said pump;
a chemical concentrate container carried by said housing, said chemical concentrate container fluidically connected to a inlet of said pump;
a fresh water container carried by said housing, said fresh water container fluidically connected to said inlet of said pump;
a proportional valve fluidically connected to said inlet of said pump, said fresh water container, and said chemical concentrate container and operating to proportion an amount of chemical concentrate from said chemical concentrate container with an amount of fresh water from said fresh water container;
a water bowl pivotally attached to a rearward end of said housing and rotatable between a retracted and extended position; and
a fresh water valve fluidically connected to said fresh water container, and operating to fill said water bowl with fresh water from said fresh water container when said water bowl is in the extended position.

2. The pet care device of claim 1, wherein said pump is an electric pump.

3. The pet care device of claim 1, wherein said fresh water container is integral with said housing.

4. The pet care device of claim 1, further comprising a flashlight positioned at a forward end of said housing.

5. The pet care device of claim 1, further comprising a U.V. lamp positioned at said end of said spray wand.

6. The pet care device of claim 1, further comprising an anti-siphon valve fluidically connected between said pump and said fresh water container.

7. The pet care device of claim 1, wherein said spray wand is telescopic.

8. The pet care device of claim 1, wherein said chemical concentrate container is integral with said housing.

9. The pet care device of claim 1, wherein said retractable leash assembly is disposed at a forward end of said housing.

10. The pet care device of claim 1, wherein said retractable leash assembly is disposed at an intermediate location between a forward end and said rearward end.

* * * * *